(12) United States Patent
Collins et al.

(10) Patent No.: US 11,841,299 B2
(45) Date of Patent: Dec. 12, 2023

(54) PARTICULATE SAMPLING DEVICE AND ANALYSIS

(71) Applicant: BIOSCOUT PTY LTD, New Lambton Heights (AU)

(72) Inventors: Lewis Alexander Collins, Dulwich Hill (AU); Henry Brindle, Roseville (AU); Saron Berhane, Matraville (AU)

(73) Assignee: BIOSCOUT PTY LTD, New South Wales (AU)

( * ) Notice: Subject to any disclaimer, the term of this patent is extended or adjusted under 35 U.S.C. 154(b) by 599 days.

(21) Appl. No.: 17/052,667

(22) PCT Filed: May 6, 2019

(86) PCT No.: PCT/AU2019/050415
§ 371 (c)(1),
(2) Date: Nov. 3, 2020

(87) PCT Pub. No.: WO2019/210375
PCT Pub. Date: Nov. 7, 2019

(65) Prior Publication Data
US 2021/0255068 A1    Aug. 19, 2021

(30) Foreign Application Priority Data

May 4, 2018  (AU) .............................. 2018901525

(51) Int. Cl.
*G01N 1/22*    (2006.01)
*G01N 15/02*   (2006.01)
(Continued)

(52) U.S. Cl.
CPC ......... *G01N 1/2208* (2013.01); *G01N 1/2273* (2013.01); *G01N 15/02* (2013.01);
(Continued)

(58) Field of Classification Search
CPC .... G01N 1/2208; G01N 1/2273; G01N 15/02; G01N 15/0637; G01N 2001/2285; G01N 2001/244; G01N 2001/245; G01N 2015/03
See application file for complete search history.

(56) References Cited

U.S. PATENT DOCUMENTS 6,200,816 B1   3/2001  Farber et al.
10,983,131 B1  4/2021  Manautou et al.
(Continued)

FOREIGN PATENT DOCUMENTS

AU    2012297590 A1    6/2013
JP    H04-331352 A    11/1992
WO    WO-2017/064376 A1  4/2017

OTHER PUBLICATIONS

International Search Report issued in International Application No. PC/AU2019/050415 dated Jul. 29, 2019.
(Continued)

*Primary Examiner* — Natalie Huls
*Assistant Examiner* — Sharad Timilsina
(74) *Attorney, Agent, or Firm* — FOLEY & LARDNER LLP

(57) ABSTRACT

Disclosed is a sampling device, a sampling system and a method of collecting samples of particulates. Also disclosed a sampling device, a sampling system and a method of generating data associated with the collection of the samples of particulates. Also disclosed is a system and method for analysing the sample data to identify the particulates in the collected samples and their one or more characteristics which may be correlated with the surrounding environment.

20 Claims, 15 Drawing Sheets

(51) Int. Cl.
*G01N 15/06* (2006.01)
*G01N 1/24* (2006.01)
*G01N 15/00* (2006.01)

(52) U.S. Cl.
CPC . *G01N 15/0637* (2013.01); *G01N 2001/2285* (2013.01); *G01N 2001/244* (2013.01); *G01N 2001/245* (2013.01); *G01N 2015/03* (2013.01)

(56) References Cited

U.S. PATENT DOCUMENTS

| | | | |
|---|---|---|---|
| 2004/0227938 A1* | 11/2004 | Craig | G01N 15/0637 356/318 |
| 2004/0232052 A1 | 11/2004 | Call et al. | |
| 2011/0026018 A1 | 2/2011 | Bartko | |
| 2016/0290912 A1 | 10/2016 | Kent et al. | |
| 2018/0087919 A1* | 3/2018 | Bertaux | G01N 21/49 |
| 2018/0095021 A1* | 4/2018 | Kikuchi | G01N 15/10 |

OTHER PUBLICATIONS

International Preliminary Report on Patentability issued in International Application No. PC/AU2019/050415 dated Mar. 4, 2020.

* cited by examiner

PARTICULATE SAMPLING DEVICE AND ANALYSIS

This application claims priority to PCT/AU2019/050415, filed May 6, 2019, entitled "PARTICULATE SAMPLING DEVICE AND ANALYSIS," which claims priority to Australian Patent Application No. 2018901525, filed May 4, 2018, all of which are incorporated by reference in their entirety.

TECHNICAL FIELD

This disclosure is directed to a sampling device for the collection of particulates from a fluid, and a method for the collection of particulates using a sampling device. This disclosure is also directed to a method for particulate detection. This disclosure also relates to analysis of particulates.

BACKGROUND ART

Airborne diseases are a threat to society. There has been some progress towards treating these diseases and reducing their impact.

Known devices for monitoring, tracking and detecting airborne diseases are static particle samplers such as the Hirst or Burkard Spore Traps. They provide a basic mechanical sampling solution and may be required to be manually transported to different locations to provide an accurate set of sample data.

The Burkard Spore Trap samples air borne particles such as pollen and other spores. It includes a vacuum pump that operates by suctions air through an orifice located in a housing. Contained inside the housing is a trapping surface located on a greased microscope slide. The air borne particles are drawn into the housing and deposited on the trapping surface of the slide by impaction through the airflow.

The Trap is located at a site according to the type of particles under investigation. If more comprehensive investigation is underway, then more than one Trap may be located at multiple sites, or the Trap may be manually moved between sites. The windspeed and particle size impact efficiency of the Spore Trap. Also, the slide requires constant checking within a short period of time to prevent the overloading of spores on the slide, and is easily contaminated. Trapped particles are viewed each day by microscope.

Great care, planning and human labour is necessary at all stages when using the Burkard Spore Trap to obtain an accurate record of air borne particles. Such known samplers may rarely achieve the ideal sampling and flow conditions and may thereby be incapable of providing the highly accurate and meaningful data necessary.

Furthermore, analysis of the collected air borne particles has traditionally limited the monitoring of diseases, requiring large amounts of human labour, expensive materials and taking lengthy periods of time in order to process and analyse collected data.

It is to be understood that, if any prior art is referred to herein, such reference does not constitute an admission that the prior art forms a part of the common general knowledge in the art, in Australia or any other country.

SUMMARY

According to a first aspect, disclosed is a sampling device for the collection of particulates from a fluid, the device comprising: an inlet through which the fluid flows into the device; and a moveable collection arrangement configured to move relative to the inlet and positioned such that a surface portion of the collection arrangement is in a collection position for collecting the particulates from the fluid flowing through the inlet, wherein the surface portion of the collection arrangement that is in the collection position varies in response to movement of the surface portion. This may be advantageous as it inhibits overcrowding of particulates on the surface portion of the collection arrangement in the collection position, as well as facilitating independent operation of the device within intervention by users to frequently change the surface portion.

In some forms, the movement of the collection arrangement is continuous.

In some forms, the movement of the collection arrangement is at a constant velocity.

In some forms, the sampling device further comprises a drive arrangement for moving the portion of the surface portions of the collection arrangement to and from the collection position. In some forms, the surface portions are contiguous on a common surface and the drive arrangement comprises a supply reel and a collection reel and the common surface may be wound about the reels and moveable from the supply reel to the collection reel. In some forms, the drive arrangement rotates the collection reel such that the surface portions move from the supply reel through the collection position to the collection reel.

In some forms, the surface portions move through the collection position whilst collecting particulates from the fluid flow and the device further comprises a sensor to determine the speed of the surface portions.

In some forms, the sensor may be positioned between the collection reel and the supply reel to determine the speed of the surface portions.

In some forms, the drive arrangement rotates the collection reel such that the surface portions move through the collection position to the collection reel. The drive arrangement may rotate the surface portions at a constant speed.

In some forms, the surface portions when in the collection position are substantially perpendicular to the flow from the outlet. This may advantageously impact the impaction of the particulates on the surface portions and thus improve the retention of the particulates on the surface portions. In some forms, the surface portions when in the collection position are transverse to the flow from the outlet.

In some forms, the sampling device further comprises a cover arranged to overlay the surfaces portions such that the particulates collected on the surface portions are retained between the cover and the surface portions. In some forms, the cover engages the surface portions between the collection position and the collection reel. In some forms, the cover is in the form of a strip or tape and wound about a covering reel. The cover may also seal the particulates between surface portions and the cover and may prevent contamination of particulates on the surface portions.

In some forms, the surface portions further comprise a biologically supportive substrate. In some forms, the sampling device further comprises a reservoir for storing the biologically supportive substrate, and a dispenser for dispensing the biologically supportive substrate from the reservoir onto the surface portions. In some forms, the dispenser is positioned such that the biologically supportive substrate is dispensed onto the surface portions prior to moving to the collection position. In some forms, the biologically supportive substrate may support the particulates on the surface portions. In some forms, the biologically supportive substrate retains the particulates on the surface portions. The biologically supportive substrate may include agar. The biologically supportive substrate may also be adhesive and assist in retaining the particulates on the surface portions.

According to a second aspect, disclosed is a sampling device for the collection of particulates from a fluid, the device comprising an inlet through which the fluid flows into the device; a collection arrangement having a surface portion positioned in a collection position for collecting particulates from the fluid flowing from the inlet; and a fluid flow control system for controlling the flow rate of the fluid at the collection position. The fluid flow control system may assist in predetermining the size of particulate that is received by the surface portions.

In some forms, the fluid flow control system may maintain a constant flow rate of the fluid. The constant flow rate of the fluid may be known to a person skilled in the art as isokinetic. The isokinetic flow rate may be controlled by the fluid control system.

In some forms, the fluid flow control system further may comprise a suction device such as an exhaust fan. The suction device may be in fluid communication with the inlet such that the fluid received through the inlet flows past the collection position prior to being exhausted from the device by the suction device.

In some forms, the speed of the suction device may adjustably control the flow rate of the fluid at the collection position. In some forms, the fluid flow control system may further comprise at least one sensor for measuring the flow rate of the fluid proximal to the surface portion in the collection position. In some forms, when the suction device is in the form of an exhaust fan, the fluid flow control system adjustably controls the speed of the exhaust fan in response to measurements from the at least one sensor. Advantageously, this may assist in selecting the particulate size and/or type received on the surface portions.

In some forms, the at least one sensor may measure the pressure differential between a stagnation pressure of the fluid flow within the sampling device proximal to the surface portion, and a static pressure external to the sampling device.

According to a third aspect, disclosed is a sampling device for the collection of particulates from a fluid, the device comprising: an intake body having an inlet and an outlet through which the fluid flows into the device; and a collection arrangement, wherein a surface portion of the collection arrangement is positioned in a collection position for collecting particulates from the fluid flowing from the outlet; wherein the inlet can be adjustably oriented such that a flow of the fluid into the inlet is substantially laminar and/or iso-axial.

It is understood to a person skilled in the art that laminar includes the fluid being uninterrupted and/or streamlined flow (i.e., not rough or spiralling). It is also understood that iso-axial sampling includes the inlet being orientated to the same direction as fluid flow. The position of the inlet may be adjusted to enable the flow to be laminar, iso-axial and/or isokinetic. Laminar flow may be advantageous as it may help to reduce any contamination of the collected particulates as well as ensuring the desired particulates are collected. It is understood that isokinetic includes the fluid flow being constant. Isokinetic sampling may be advantageous as this may increase the collection efficiency of a sampling device. Some of the size particulates may change size if they are not substantially laminar and thus may not be received on the surface portions as desired. Advantageously, the flow may be iso-axial and/or isokinetic reduces turbulence and allows for laminar flow into the sampling inlet.

In some forms, the intake body that extends between a first end and a second end, wherein the inlet is positioned at the first end of the intake body and the outlet is positioned at the second end. In other forms, the inlet and the outlet may overlay one another in the intake body.

In some forms, the outlet is arranged relative to the inlet such that the fluid flow is substantially laminar and/or iso-axial when it flows from the outlet.

In some forms, the collection arrangement is orientated such that the surface portion is substantially perpendicular to the fluid flow from the outlet.

In some forms, the sampling device may further comprise an angular control system that is arranged to orient the inlet relative to an ambient flow of the fluid such that the fluid flow into the inlet is substantially laminar.

In some forms, the angular control system may be arranged to control pitch of the inlet relative to the device.

In some forms, the angular control system may be arranged to control yaw of the inlet relative to the device.

In some forms, the sampling device may further comprise a sensor for sensing the direction of the ambient flow of the fluid.

In some forms, the angular control system adjustably orients the inlet in response to the direction of the ambient flow of the fluid sensed by the sensor.

In some forms, the at least one sensor may be at least one of:
a forward-facing pitot—static tube connected to at least one pressure sensor;
a gyroscope;
an accelerometer;
compass;
GPS;
IMU; and/or
an anemometer According to a fourth aspect, disclosed is sampling device according to any one of the previous aspects, wherein the device is a mobile device and operative to collect particulates whilst the device is in motion. According to a fifth aspect, disclosed is sampling device according to any one of the previous aspects, wherein the device is a static or stationary device.

In some forms, data collected by the sampling device may be stored by the sampling device. Advantageously, when the device is in the form of the mobile device, specific particulates may be correlated with the collection of atmospheric data (such as wind, temperature and humidity) and geospatial information (such as time and location). In some forms, the stored data may be stored on a memory device. The memory device may be removable.

According to a sixth aspect, disclosed is a method for particulate detection comprising positioning a collection surface with respect to at least one sensor which may include an optical and/or a spectral sensor; sensing particulates received on the collection surface using the at least one optical or spectral sensor; and analysing collected data from the at least one sensor using a processor.

In some forms, the collection surface may be in the form of moveable surface portions of a collection arrangement and the step of positioning comprises moving the surface portions into a collection position.

In some forms, the moveable collection surface is moved by a drive arrangement.

In some forms, the surface portions are contiguous on a common surface and the drive arrangement comprises a supply reel and a collection reel and the common surface is wound about the reels and moveable from the supply reel to the collection reel.

In some forms, the drive arrangement rotates the collection reel such that the surface portions move from the supply reel through the collection position to the collection reel.

In some forms, the surface portions move through the collection position whilst collecting particulates from the fluid flow and the device further comprising a sensor to determine the speed of the surface portions.

In some forms, the sensor positioned between the collection reel and the supply reel to determine the speed of the collection surface.

In some forms, the drive arrangement is operable, in response to the speed of the surface portions determined by the sensor, to adjust the movement of the collection arrangement such that the movement of the surface portions can be scanned by at least one of the optical and spectral sensors.

In some forms, the method further comprises scanning the surface portions by the at least one optical and spectral sensors, wherein the surface portions when in the collection position, are substantially perpendicular to the at least one optical and spectral sensors.

In some forms, the processor correlates geospatial data with the collected data.

In some forms, the method includes training a detection algorithm to identify the particulates. Further, the collected data may be used to further train the detection algorithm.

In some forms, the processor utilises at least one of convolutional neural networks and computer deep learning methods to train the detection algorithm.

In some forms, the detection algorithm includes a computer vision algorithm. The computer vision algorithm may include an object recognition algorithm, a neural network algorithm, or a combination thereof.

According to a seventh aspect, atmospheric and geospatial data collected by the sampling device according to any one of the first to fifth aspects may be stored by the sampling device. In some forms, the device is a static device, and in some forms, the device is a mobile device and operative to collect particulates whilst the device is in motion. Advantageously, specific particulates may be correlated with the collection of atmospheric data (such as wind, temperature and humidity) and geospatial information (such as time and location). In some forms, the stored data is stored on a removable memory device.

In an eighth aspect, there is disclosed a sampling system for the collection of particulates from a fluid. The system comprises an intake body having an inlet and an outlet through which the fluid flows into the device. The system also comprises a moveable collection arrangement including surface portions for collecting the particulates from the fluid flowing through the intake body, the moveable collection arrangement being in accordance with that mentioned in the first aspect above. The system also comprises a fluid flow control system for controlling the flow rate of the fluid at the surface portions, the fluid flow control system being in accordance with that mentioned in the second aspect above. The inlet can be adjustably oriented such that a flow of the fluid into the inlet is substantially laminar and/or isoaxial, the fluid flow of the system being further defined in accordance with the third aspect mentioned above.

The further features which are mentioned in respect of the third aspect above may also be applicable to the sampling system.

In some forms, the sampling system may further comprise a particulate analysis system, the particulate analysis system comprising:
at least one of an optical and spectral sensor, the at least one of an optical and spectral sensor being positioned with respect to the surface portions such that particulates received on the surface portions can be sensed by the at least one of an optical and spectral sensor, and
a processor, the processor being connectively integrated with the at least one of an optical and spectral sensor such that the particulates that are sensed by the at least one of an optical and spectral sensor can be analysed by the processor.

In some forms, the processor may correlate data produced during the analysis with telemetry data collected by the sampling system.

In some forms, the processor may include a detection algorithm to process a scan data from the at least one of an optical and spectral sensor, to identify the particulates received on the surface portions.

In some forms, the detection algorithm may be a computer vision algorithm, which includes an object recognition algorithm, a neural network algorithm, or a combination thereof.

In some forms, the detection algorithm may include a machine learning algorithm trained using the scan data.

In some forms, the detection algorithm may be training using a convolutional neural network method or a computer deep learning method.

In some forms, the processor analysis may comprise generating a database of particulate data.

In some forms, the processor analysis may comprise converting the database of particulate data into a map for a survey region where the particulates are collected.

According to a ninth aspect, disclosed is a method of monitoring for airborne particulates comprising
collecting samples of airborne particulates;
generating geospatial data associated with the collection of the samples of airborne particulates;
generating sample data from the collected samples of airborne particulates,
analysing the sample data to identify the particulates in the collected samples; and
correlating one or more characteristics of the identified particulates with the geospatial data.

In some forms, the method further comprises generating atmospheric data associated with the collection of the samples of airborne particulates; correlating characteristics of the identified particulates with the atmospheric data.

In some forms, the characteristics of the identified particulates comprise any one or more of type, classification, size, or concentration. The characteristics of the identified particulates may include whether the particulates are carrying pollution or disease which may be harmful to its surroundings.

In some forms, the sampled data is image and/or spectral data.

In relation to all the aspects, in some forms, the fluid is in the form of air, and thus the particulates are airborne.

It is understood by a person skilled in the part that in relation to all the aspects the fluid may be atmospheric air containing airborne particulates. In other forms the fluid could be gas or liquid samples. In some forms the particulates could be pollutants or pathogens or any other airborne particulates.

BRIEF DESCRIPTION OF THE DRAWINGS

Embodiments will now be described by way of example only, with reference to the accompanying drawings in which.

DETAILED DESCRIPTION

Figure 1:
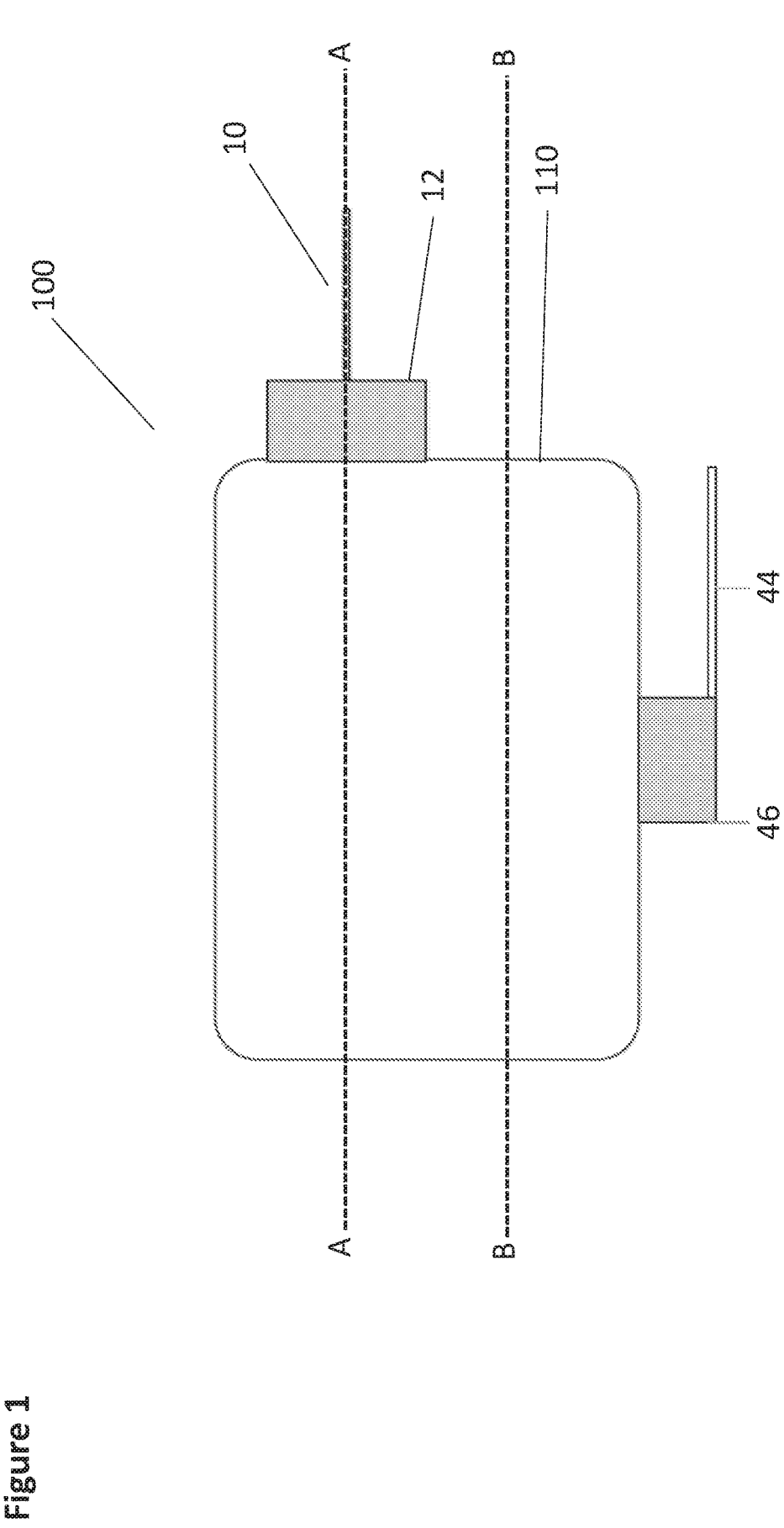
FIG. 1 is a side view of an embodiment of a sampling device.

In the following detailed description, reference is made to accompanying drawings which form a part of the detailed description. The illustrative embodiments described in the detailed description, depicted in the drawings and defined in the claims, are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

The sampling device 100, analysis system 400, and sampling and analysis system 500 disclosed herein relate to the collection and identification of a range of air borne particulates, such as pathogens. Such devices and systems may be beneficial in identifying hazardous particulates. This may help in preventing the spread of diseases carried by air borne particulates.

The sampling device 100 disclosed includes a number of aspects which may assist in improving the efficiency collection and identification of air borne particles. Some of these different aspects of the sampling device that will be discussed in more detail below are as follows:

control of collection arrangement;
control of fluid intake;
control of inlet and outlet orientation; and
real-time analysis.

Further, data collected by the sampling device can be stored by the sampling device. For example, specific particulates can be correlated with the collection of atmospheric data (such as wind, temperature and humidity) and geospatial information (such as time and location). This data can then be stored on a memory device, transmitted by a telecommunication means 252 to a server off-site or transmitted to the cloud. The memory device may be removable.

Although, this is not an exhaustive list of aspects of the sampling device 100, these aspects may contribute to providing high-precision analysis which may contribute to infestation maps and threat prediction software of diseased air borne particulates. The atmospheric and geospatial data collected by the sampling device may also assist in developing the infestation maps and threat prediction software. Further techniques employed to develop the infestation maps and threat protection software will also be discussed in more detail below.

The air borne particulates to be collected may include many different types and forms. For example, the device may collect aerobiological particulates which may include particles, pathogens (e.g., bacterial, viral, fungal etc.), allergens, spores, pollutants and pollens etc. The air borne particulates may be any size, and for example may range in size from 1 um to 100 um in diameter.

Sampling Device

The sampling device 100 (also known as a sampler) can be integrated into numerous mobile or static platforms. Once configured, the sampling device 100 is then able to autonomously collect air borne particles. In addition to collecting a sample of airborne particulates, the sampling device 100 can also collect atmospheric data 80 (such as wind, temperature and humidity) and geospatial information 82 (such as time and location).

Figure 6C:
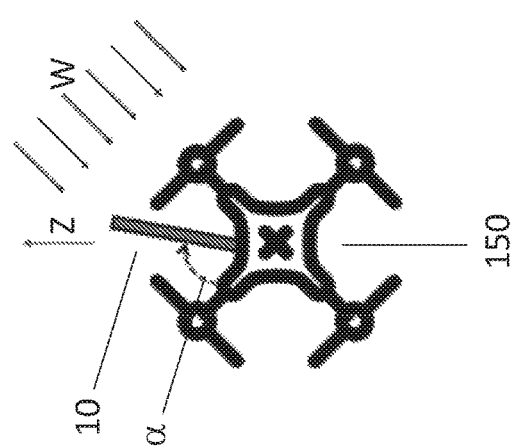
FIG. 6C is a plan view of the mobile embodiment of the sampling device of FIGS. 6A and 6B.
Figure 6B:
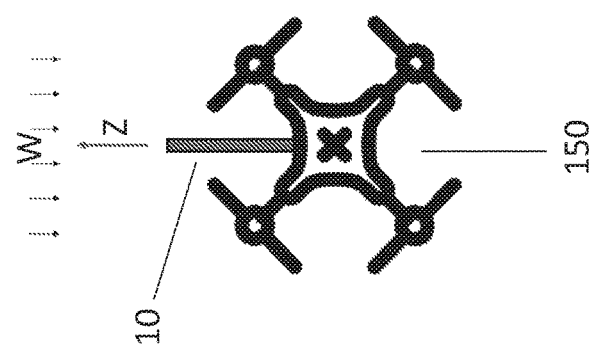
FIG. 6B is a plan view of the mobile embodiment of the sampling device of FIG. 6A.
Figure 6A:
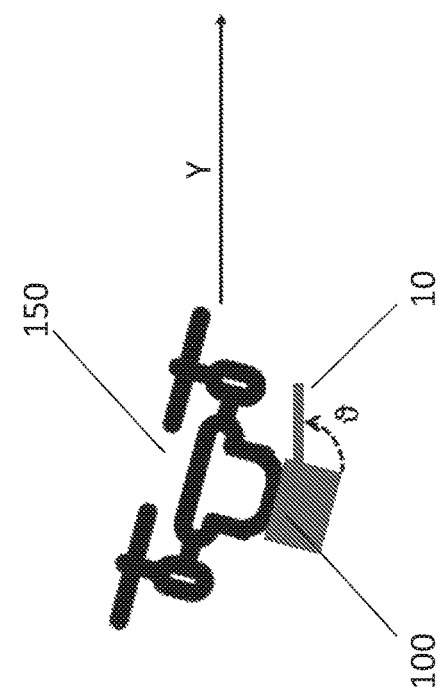
FIG. 6A is a front view of an embodiment of a mobile embodiment of the sampling device.

Various mobile devices can be used, such as an unmanned ground vehicle or automobile, or an unmanned aerial vehicle (UAV) sampling device, or any suitable device that is able to operate with various degrees of autonomy: either under remote control by a human operator, autonomously by onboard computer, autonomously through a predetermined flight plan, or autonomously through offboard computers. For example, in some embodiments, the sampler 100 can be integrated with an aerial vehicle such as a multirotor drone 150 (FIGS. 6A, 6B, & 6C). The integrated mobility device (e.g. drone 150) can be programmable to accept a predetermined route which is then either autonomously executed or manually over-written. The pre-determined route can be a continuous movement, or can include one or more waypoint stops.

A static sampling device may also operate autonomously. For example, in some embodiments the sampling device 100 can be mounted on a pole via a marine-grade swivel bearing. The height of the system can be adjustable so as to correspond to crop canopy height (typically 1 to 5 meters above the ground). A wind vane can be used in some embodiments to assist in directing an intake body (e.g., an intake nozzle) into the wind. This may improve collection efficiency.

The sampling device 100 can be sealed in an enclosure with an ingress protection rating of IP66 or higher. This may improve longevity of the sampling device 100 and may reduce the likelihood of the interior of the device being damaged by contaminants such as water and dust.

The sampling device 100 can be configurable to collect particulates ranging from 1 um to 40 um in diameter. This range may advantageously allow for both bacterial and fungal particulate detection whilst avoiding the collection of spurious material such as soil particles and other debris. The device can be modified in some embodiments to collect particulates of other sizes, such as pollens which may be as big as 100 um.

Figure 2:
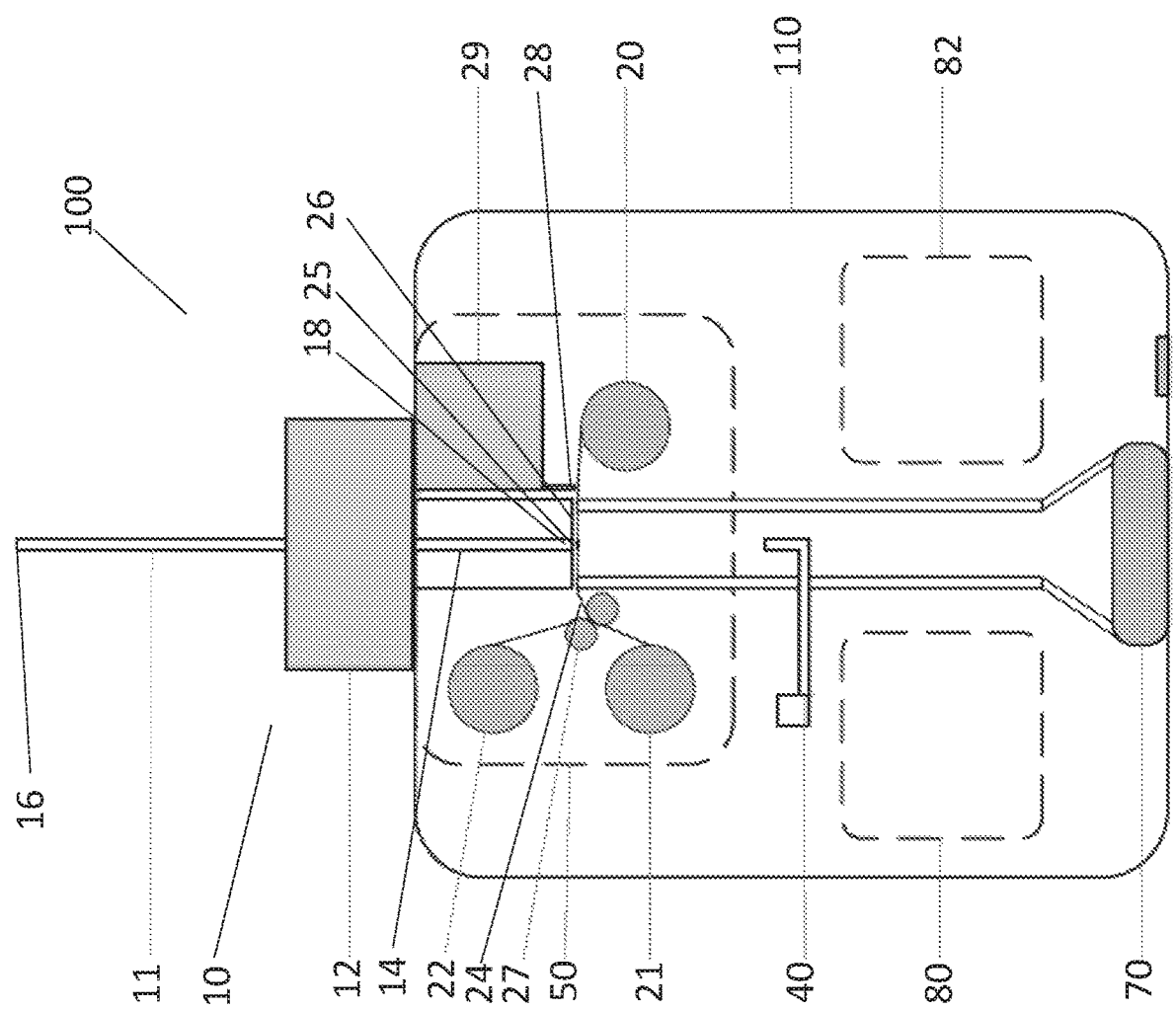
FIG. 2 is a cross-sectional top view of the sampling device of FIG. 1 along the line A-A.

In the embodiments shown in FIGS. 1 and 2, the collected particulates, once captured on a surface portion 26, can be stored on a tape cassette-like system 50. The cassette-like system 50 can be a removable device that is able to store the collected particles for further analysis. Once a sample has been collected, the cassette-like system 50 can be moved between the sampler device 100 and the analysis system 400 for post-processing. In some embodiments, a collection reel 21 can be removable (like a cassette) for storage or transport to alternative systems for further analysis.

Figure 5:
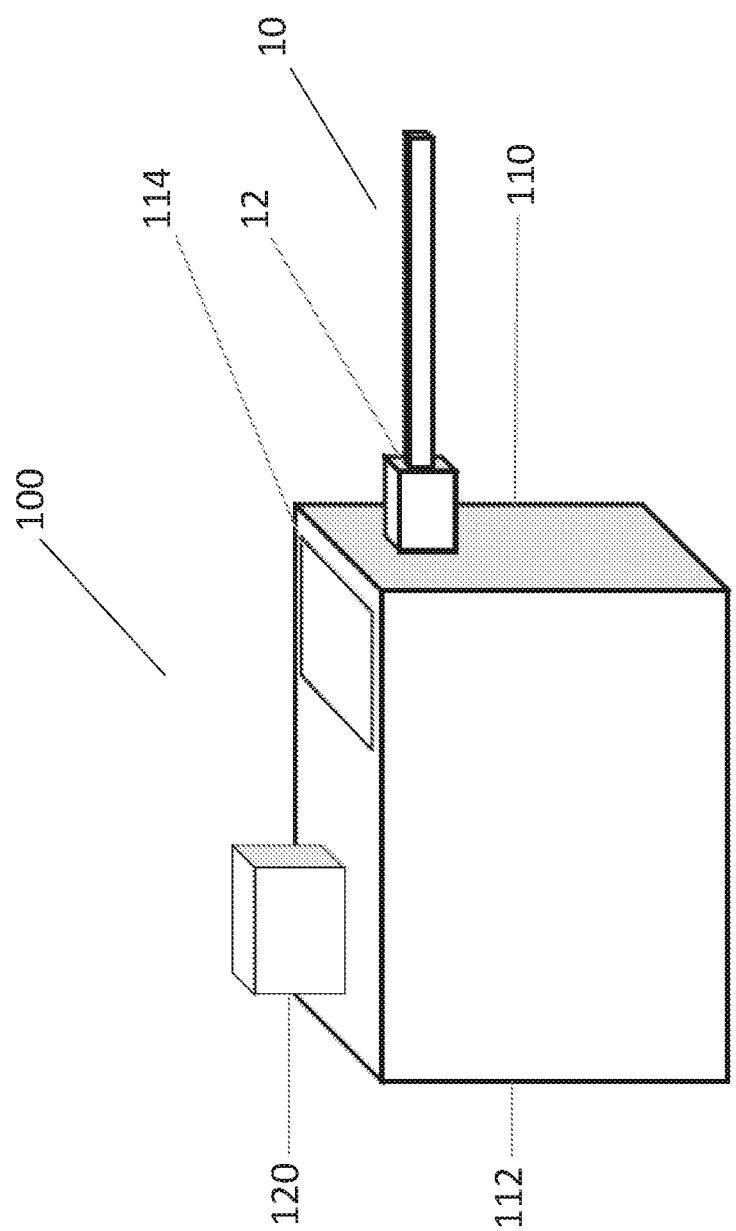
FIG. 5 is an isometric perspective view of the sampling device of FIG. 1

In addition to removing collected samples, it may be possible to remove and replace other internally stored devices such as components of the electronics module 84, including data storage devices and communication devices. For example, when a cassette-like system 50 is used to collect and store the samples (FIGS. 1, 2 & 5) the cassette-like system 50 may be removed as a singular unit through a hatch 114 in the outer casing 110 of the sampler 100. Alternatively, portions of the outer casing 110, such as the back panel 112, may be removed to access the removable components from within the sampler 100.

The mobile sampling device 100 can exhibit an extended battery life, whilst also incorporating the ability to quickly replace exhausted batteries 90. In some embodiments, the sampling device 100 can be charged by a solar panel attached to either the device or the system. This can extend the longevity of the sampling collection and analysis period when either stationary or mobile.

The sampling device 100 can incorporate a number of collection control mechanisms, each of which may optimise the collection efficiencies of the device. These mechanisms include at least one of controlling the motion of the collection arrangement, controlling the rate or volume of the fluid intake, or controlling the inlet and outlet orientation. These mechanisms will be discussed in detail below.

Control of Collection Arrangement

The sampling device 100 includes a collection arrangement including a surface portion 26 for collecting the air borne particles (e.g., particulates and/or pathogens). In order to deposit the particulates on the surface portion 26, the device 100 generally includes an intake body having an inlet 16 for receiving fluid containing particulates therethrough into the sampling device 100. The intake body also includes an outlet 18 formed at an end of the intake body 10 that faces the interior of the sampling device 100, and more specifically, the surface portion 26. The fluid flows into the sampling device 100 via the outlet 18. In alternative embodiments, the inlet and outlet may overlay one another to form opposing sides of the same aperture.

In the embodiment illustrated in FIGS. 1 to 5, the intake body 10 is in the form a nozzle system. The nozzle system generally includes the inlet 16, an inlet body 11, a nozzle control module 12, an outlet body 14 and an outlet 18.

The sampling device 100 also generally includes the surface portions 26 on which the particulates are collected for analysis. The surface portions may in some embodiments be a continuous length of sampling tape, whilst in other embodiments the surface portions may be individual sampling slides.

In the illustrated embodiment, the surface portions 26 are contiguous on a common surface in the form of a continuous length of sampling tape that includes an adhesive for receiving and retaining the particulates on the surface portions 26. In alternative embodiments, silicone, grease or petroleum jelly can be used to coat the surface portions whereby they may act as an adhesive medium for retaining pathogens or particulates captured on the surface portions. In an alternative embodiment, not shown, the collection arrangement may include discrete slides each including a surface portion that may be moved through the collection position.

Figure 3:
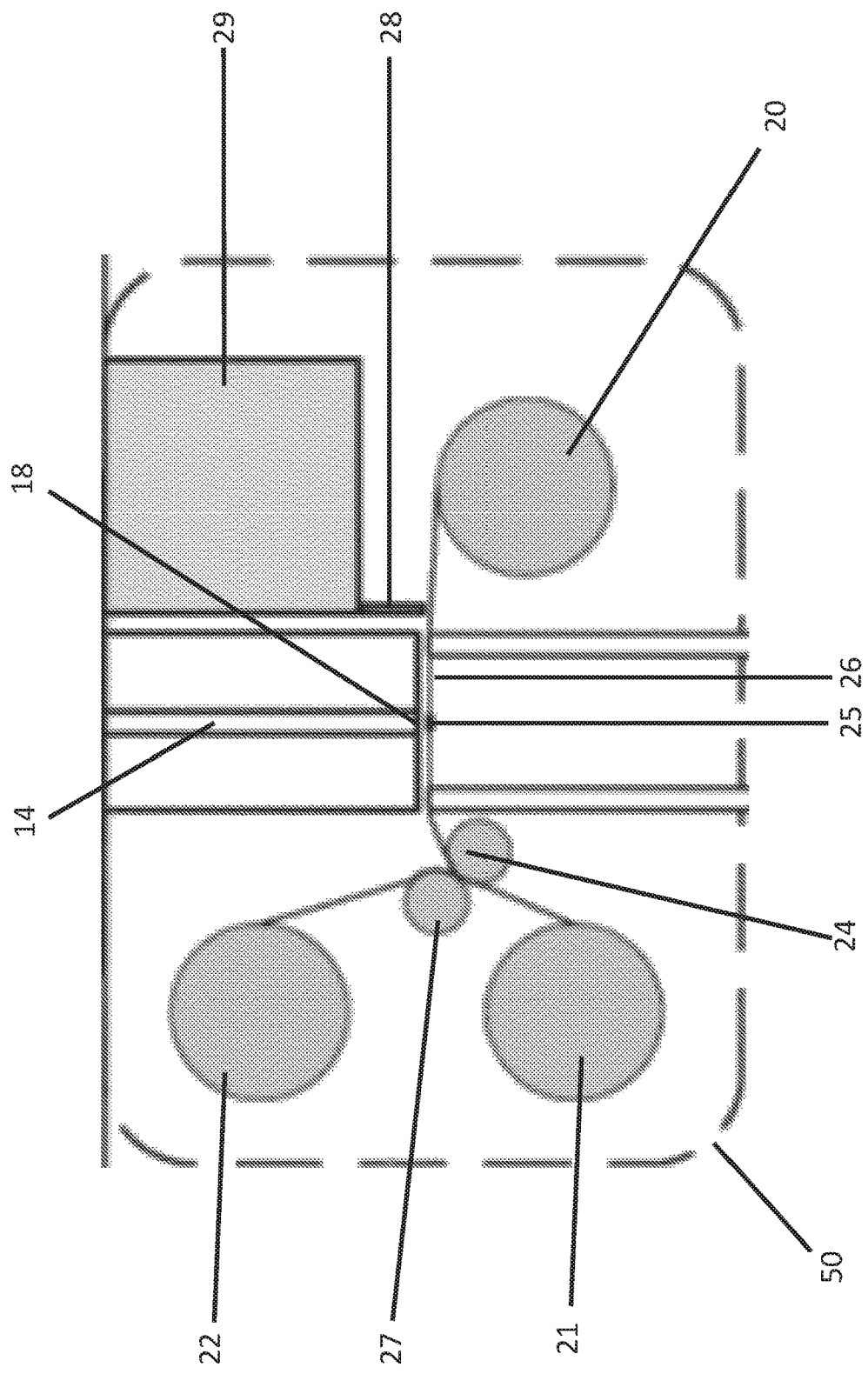
FIG. 3 is a close-up cross-sectional top view of an embodiment of a moveable collection arrangement of the sampling device of FIG. 2.
Figure 4:
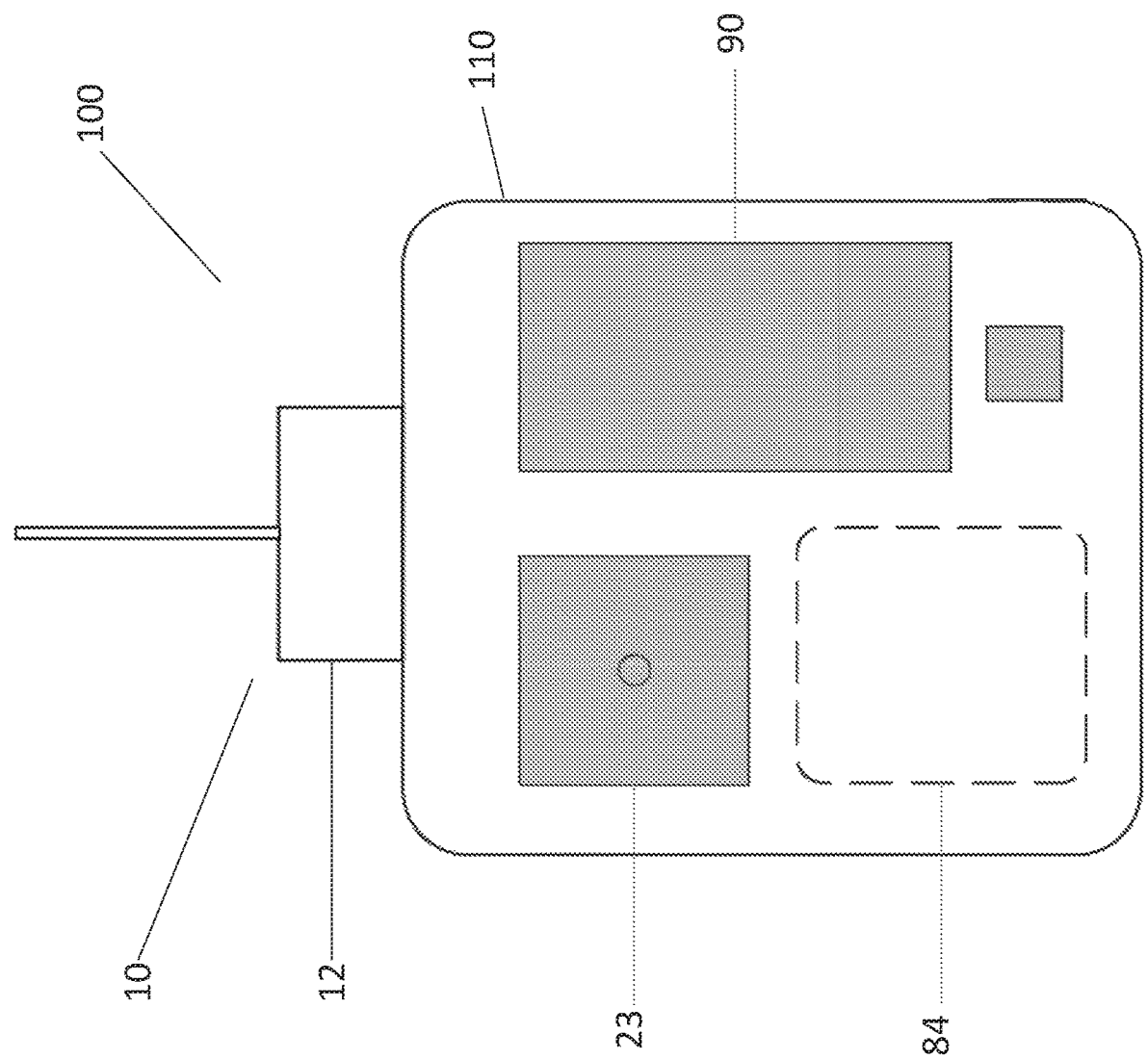
FIG. 4 is a cross-sectional bottom view of an embodiment of the sampling device along the line B-B of FIG. 1.

In the embodiment illustrated in FIGS. 1 to 3, the collection arrangement is positioned such that the surface portion locates in a collection position 25 adjacent the outlet 18 for receiving the particulates. Thus, particulates contained in the fluid exiting the outlet 18 can impact the surface portion in the collection position 25. The surface portion 26 can be positioned and angled such that the surface portion 26 is substantially perpendicular to the flow of fluid being emitted from the outlet 18 (i.e. perpendicular to the plane of the sampling tape or slides). This may advantageously improve the accuracy of the sampling by evenly deflecting the substantially laminar airstream as it passes the surface portion 26 whereby particulates contained in the fluid that are above a threshold diameter can be propelled across the airstream lines and can be deposited on the surface portion 26. In alternative embodiments, not shown, the surface portion of the collection arrangement can be positioned and angled at an angle between 0 and 90 degrees relative to the fluid flow being emitted from the body.

The surface portion 26 can be configured to move relative to the outlet 18 of the intake body 10 such that the surface portion 26 that is in the collection position 25 varies in response to movement of the collection arrangement. The movement of the collection arrangement can be constant and continuous or at discrete intervals. The surface portions 26 can be controlled such that it maintains a constant velocity as it passes the collection position 25. This may help to inhibit overloading of particulates at a particular surface portion 26. Controlling the movement and velocity of the surface portions 26 may help to improve the analysis of the particulates captured, as they can be correlated with the specific time, location, wind speed, wind direction, or any other data that was recorded during collection.

In embodiments where the surface portions 26 are continuous on a common surface such as a tape, such as is illustrated in FIGS. 1 to 3, the sampling device 100 can also include a cassette-like supply reel 20 and a collection reel 21 system. The tape providing the common surface of the surface portions 26 can be transferred from being wound around the supply reel 20 to being wound around the collection reel 21. Intermediate the supply 20 and collection 21 reels, the surface portion 26 tape is passed by the collection position 25.

In some embodiments (see FIGS. 2 and 3), a fine film of biologically supportive substrate (such as agar) stored in a Biological Substrate Reservoir 29 can be secreted through a dispenser 28 onto the surface portion 26 before it reaches the collection position 25. This may advantageously assist particulates to retain and/or survive the sampling process such that further analysis can be undertaken.

A cover is also included to assist in retaining the particulates on the surface portions 26. The cover is in the form of a second reel of sampling tape can be wound around a covering reel 22, the covering reel sampling tape also including an adhesive. The covering reel 22 is positioned such that the second reel of adhesive-based sampling tape can be transferred from the covering reel 22 and applied to the particulate containing surface portion 26 such that the particulates collected on the surface portion 26 are sealed between the two layers of tape prior to being wound around the collection reel 21. The two layers of tape can be retained, and in some embodiments sealed, together by passing the collection tape and covering tape between rollers 27 located proximal to one another whereby the two tapes are pressed together and adhesively sealed to one-another.

The transfer of the surface portion 26 between the supply 20 and collection 21 reels can be facilitated by a drive arrangement. The drive arrangement generally includes a motor 23. The device also includes a sensor (not visible in Figures) to assist in determining the speed of the surface portions which may inform the operation of the drive arrangement. In some embodiments, the motor 23 provides drive that engages and rotates the collection reel 21 such that it pulls and unwinds the surface portions 26 from a free spinning supply reel 20. In some embodiments, the motor 23 or a plurality of motors can provide drive that engages both the supply 20 and collection 21 reels such that they are each rotatably driven whilst maintaining tension in the surface portions 26. In embodiments where a covering reel 22 is included, the covering reel 22 may be rotated by engagement with the motor, or pulled and unwound by the rotation of the collection reel 21.

In embodiments where the surface portions 26 are provided by a continuous tape, as the tape moves (e.g. by the reel rotating), a different surface portion is positioned to be the surface portion 26 in the collection position. The movement of the tape is controlled by a tape motor control 245. The tape motor control 245 receives input data from a tape position encoder 247 (see FIG. 8A) which tracks the processed portion of the tape surface which was positioned as the surface portion 26. Thus the tape position encoder 247 also tracks the next portion of the tape surface to be positioned as the fresh surface portion 26. The tape position encoder 247 tracks, i.e. encodes or labels the position of the current surface portion 26 in relation to the full length of the tape. The tape position encoder 247 may "track" the position of the current surface portion in another manner, e.g. by tracking the angle by which the reel has rotated, or by tracking the number of angular "steps" which has been taken, to move a particular tape portion in position to be the current surface portion 26.

Figure 8A:
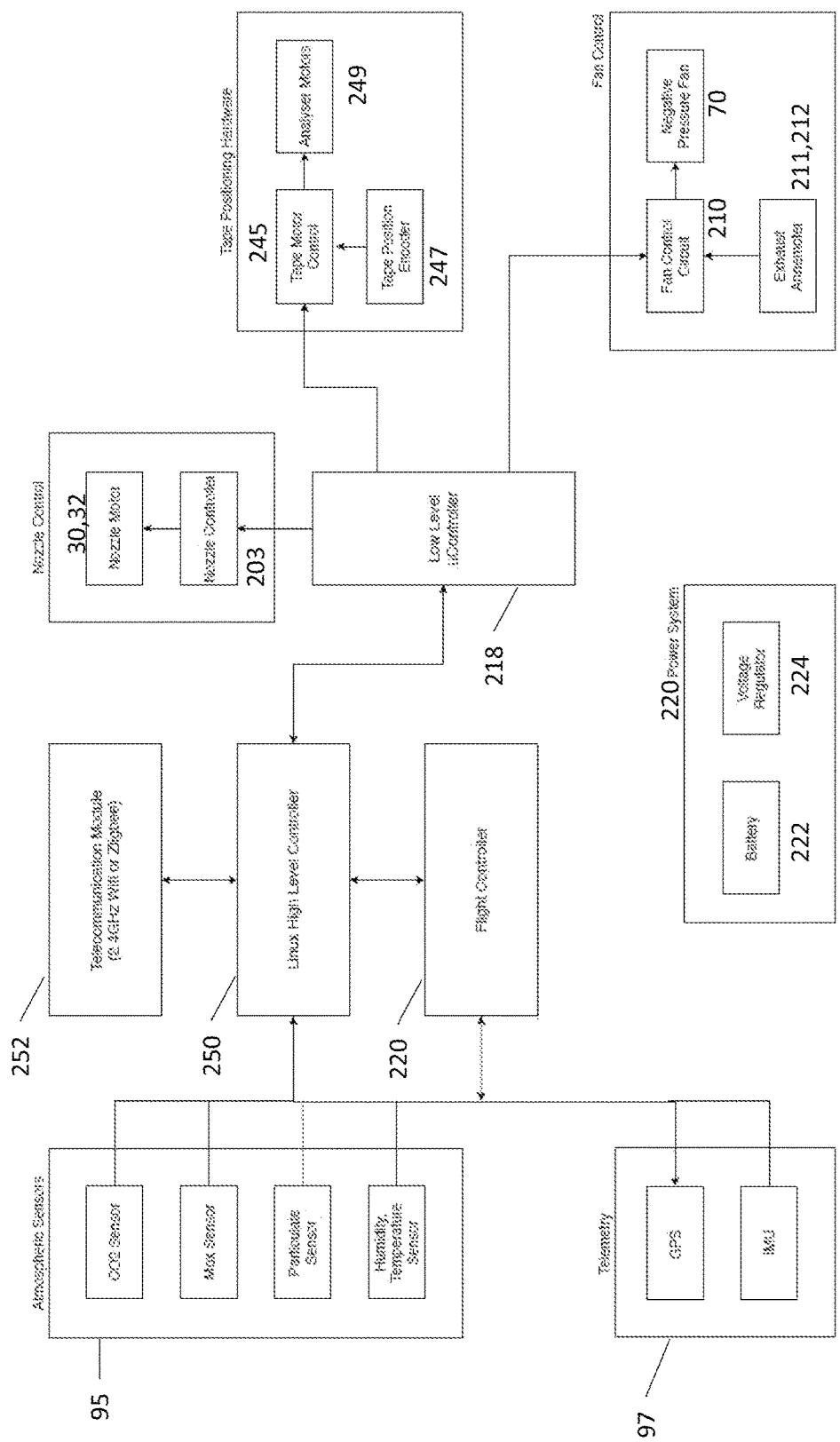
FIG. 8A is flow diagram of a first embodiment of a system for the collection and analysis of particulates.

The tape motor control 245 is adapted to, on the basis of the input data from the tape position encoder 247, drive the analyser motor(s) 249 (see FIG. 8A). In some embodiments, the movement of the tape may be driven by an arrangement comprising a stepper motor driver 244 and a stepper motor 246 (see FIG. 8B).

In an alternative embodiment, not shown, the drive arrangement may alternatively comprise a DC brushless motor with a rotary encoder attached to the capstan spool which may replace the idler pully which provides for smoother linear motion of the tape. In this embodiment the collection reel can be motorized by the stepper motor arrangement.

The tape motor control 245 controls the speed at which the tape moves. To facilitate this control, a sensor 248/249 can measure the speed of the surface portion 26 at which it passes the collection position 25. Knowing the speed of movement of the surface portion 26 at the collection position 25 may be advantageous, as it may assist with calculating the concentration of particulates and correlating the collected particulates on the surface portions with a time and/or location. The sensor 248/249 (or rotary encoder) can also be used to measure and record the relative position of the surface portions 26 during collection of particulates.

In the illustrated embodiment (FIGS. 1 to 3), the sensor includes a rotary encoder which measures the rotational speed of an idler pulley 24 which is rotated by the surface portions 26 in the form of tape when it moves between the supply 20 and collection 21 reels. The rotary encoder can, in some embodiments, consist of an absolute magnetic angle position sensor that measures the rotation of a two-pole magnetic cylinder on the axis perpendicular to the rotation. The angular velocity measurements of the rotary encoder can then be translated into linear speed by the controller 250.

Figure 9A:
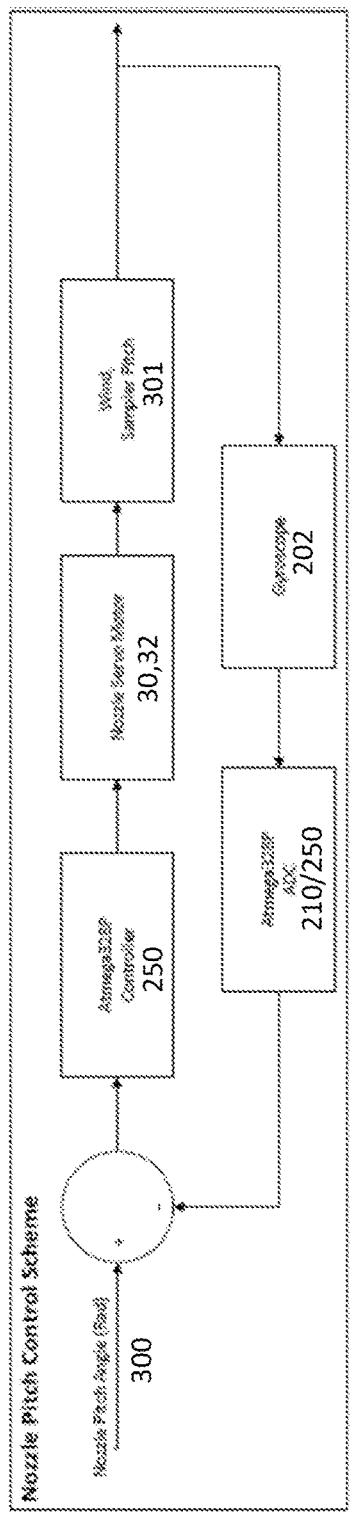
FIG. 9A is a flow diagram of an embodiment a method of inlet and outlet control using the disclosed sampling device.
Figure 9B:
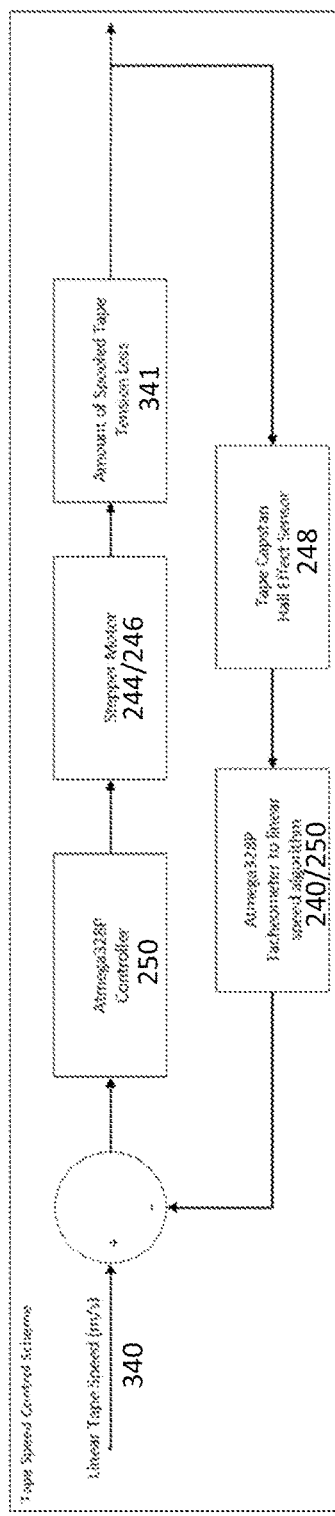
FIG. 9B is a flow diagram of an embodiment of a method of control of the moveable collection arrangement using the disclosed sampling device.

In use, a feedback loop such as the one illustrated in FIG. 9B can be used to control the speed of movement of the collection arrangement. In the depicted example, a predetermined collection speed 340 is input into the controller 250. The controller 250 then controls the motor 244, 246. The motor 244, 246 drives the surface portions 26 to move. This movement potentially causes the tape to momentarily lose some tension (as represented by reference 341 in FIG. 9B). The speed of the movement of the surface portions 26 (e.g., tape) is adapted to be measured by a sensor 248 (e.g. a tacheometer/hall effect sensor). The data from the sensor 248 is fed back to the controller 250 (or a processing circuit, such as a differential amplifier, which feeds to the controller 250) in a negative feedback control loop. The controller 250 utilises the feedback from the sensor 248 to adjust the control signal output to the motor 244, 246 accordingly, such that even as the radius of the surface portion 26 tape wound around the collection reel 21 varies (i.e. increases due to a lessening of spool tension) during the continuous sampling, the motion of the surface portion 26 is maintained at a constant speed.

Fluid Flow Rate Control

The sampling device 100 may also include a fluid flow control system for controlling the flow rate of the fluid through the sampler at a predetermined flow rate (as shown in FIGS. 2, 5, 8-10, 13-14). As the fluid and the particulates contained in the fluid exit the outlet 18, the fluid flow may be substantially laminar and moving at a uniform velocity. The streamlines of fluid exiting the outlet 18 can be deflected around the surface portion 26 at the collection position 25 whereby a centripetal force acts on the particulates contained in the fluid. As a result of the centripetal force, particulates above the threshold aerodynamic diameter can be propelled across the streamlines whereby they can be deposited onto the surface portion 26. Particulates below the threshold aerodynamic diameter can continue flowing with the streamlines past the surface portion.

The Stokes Number is defined by the equation:

$$St = \frac{\rho * dp^2 * C * V}{9 * \mu * L * W^2}$$

With the aid of this equation the relationship between the following parameters can be determined:

the aerodynamic diameter of a particulate;

the physical dimensions of the outlet 18;

the velocity of the fluid exiting the outlet 18; and the viscosity of the fluid exiting the outlet 18.

Thus it can be seen that by controlling the fluid flow to a particular velocity, the Stokes Number equation can be rearranged to dictate a particular threshold aerodynamic diameter for the sampling device 100.

In some embodiments, the sampling flow rate is predetermined. In some further embodiments, the predetermined flow rate can correspond to a desired fluid velocity at the collection position 25 of the surface portion 26 such that a particular diameter of particulate may be collected.

In some embodiments, the sampling flow rate is maintained at a constant flow rate of fluid. This may advantageously negate the effects of relative flow rate of the fluid into the intake body 10 and sampling device 100 (e.g., wind speed). Maintaining a constant flow rate of fluid at the collection position may also advantageously improve the accuracy of any correlations made between the volume of samples collected and any time or location data gathered.

The fluid flow control system generally includes a means of creating the suction force necessary for fluid sampling. In the embodiment shown in FIGS. 1-5, a centrifugal exhaust fan 70 is used to generate a vacuum behind the collection position 25 of the surface portion 26 such that fluid containing particulates can be drawn through the sampling device at a controlled flow rate. This may also advantageously reduce turbulence in the collected fluid. The suction can modulate the fluid flow within the sampler 100 for the desired sampling flow rate.

To control the means of creating the suction force (e.g., exhaust fan 70) and thereby adjustably control the relative rate of fluid flow past the surface portion 26, the disclosed sampling device 100 can further comprise at least one sensor 40 that measures the fluid speed. The sensor 40 can be located such that it measures the rate of fluid flow proximal to the portion of the surface portion in the collection position. In some embodiments (such as in FIG. 2), the at least one sensor 40 is located such that fluid reaches the sensor 40 after passing the surface portion 26. This may advantageously minimise disruption of the fluid flow.

A control circuit, such as a fan control circuit 210, controls the means of creating the suction force. In some embodiments, a low level system controller 218 (e.g. see the embodiment shown in FIG. 8A) denotes the intervening control layer between the high level system controller 250 and the various controllers for the sampler 100, including the fan control circuit 210. The control paradigm (involving controller 250, 210, 218) utilises, in linear feedback control such as a negative feedback loop (see FIGS. 8A, 8B and 9C), input data from one or more pressure sensors 211, 212 (e.g. anemometer, pitot tubes etc), to control the fan circuit 214, 216 on the basis of the negative pressure generated by the fan. As shown in FIG. 9C, a computation module, which implements a pressure to flow rate conversion algorithm, converts the data from the one or more pressure sensors 211, 212 into a flow rate data. This flow rate data is then fed back to the controller(s) 250, 218 in the negative feedback. The computation module can reside in the high level system controller 250, the low level system controller 218 (if provided), or the fan control circuit 210. Thus, the feedback maintains or aims to maintain a constant flow rate as generated by the fan. For example, the sensor 40 can measure the pressure differential inside the sampling device 100, enabling the calculation of the fluid velocity based on Bernoulli's equation. In the embodiment illustrated in FIGS. 1 and 2, two pitot-static tubes 40, 44 are used to measure the pressure differential between the stagnation pressure of the fluid flow within the sampling device 100 proximal to the surface portion (as measured by one of the pitot-static tubes 40), and the static pressure (as measured by the other pitot-static tube 44) external to the sampling device 100. The pitot-static tube for measuring static pressure 44 external to the sampling device can in some embodiments be rotated to adjust for pitch and yaw such that the fluid flow is laminar in the pitot-static tube. This may advantageously improve accuracy of the pressure readings. In the illustrated embodiment, the pitot-static tube 44 for measuring static pressure is attached to a servo motor 46 that adjust for pitch and yaw based on a gyroscope sensor (not shown).

In some alternative embodiments the pressure differential may be calculated using hot-wire anemometers or ultrasonic anemometers. Using the measured pressure differential, the velocity of the fluid and hence the flow rate can be calculated at the outlet 18.

Figure 8B:
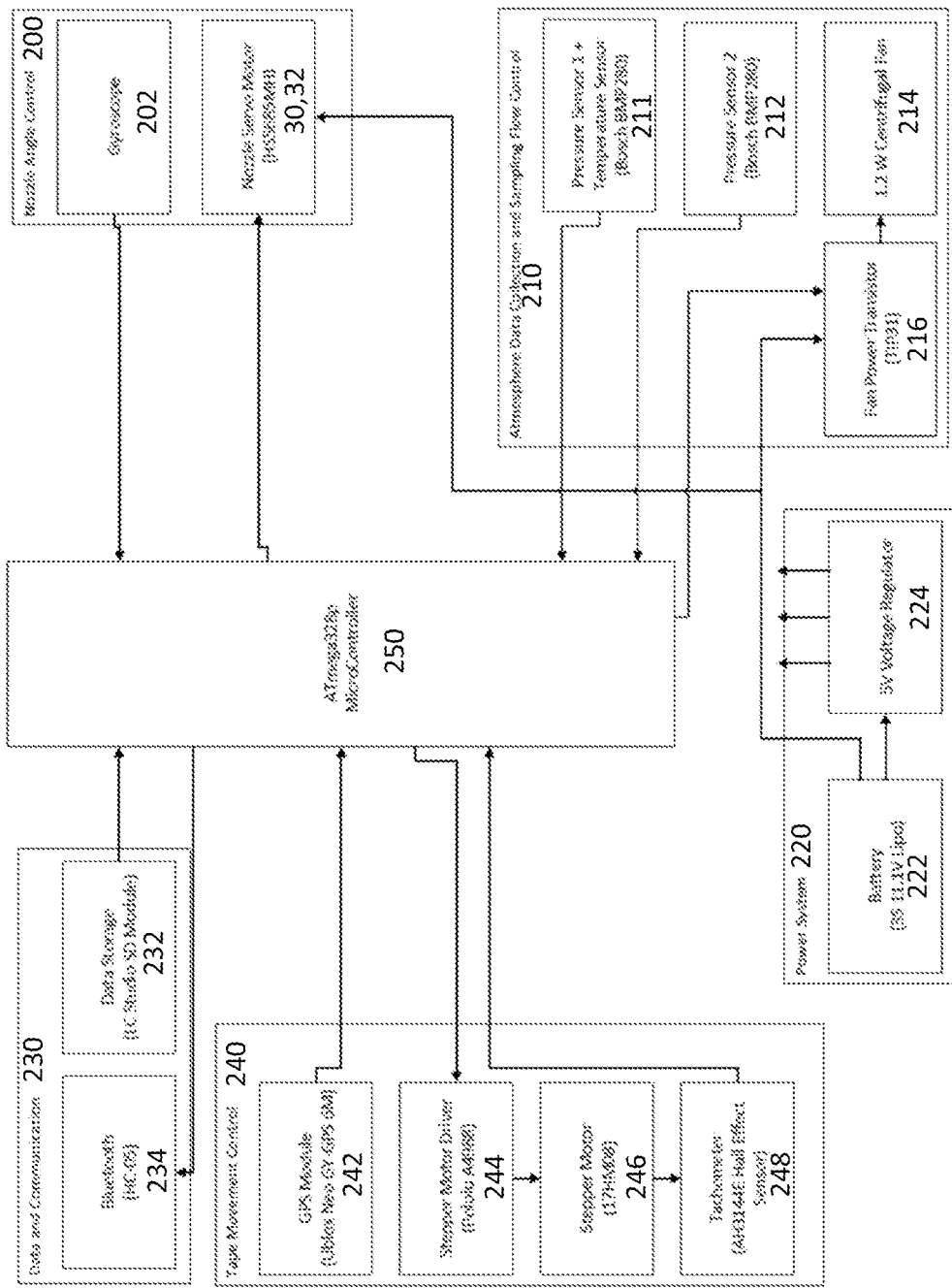
FIG. 8B is flow diagram of a second embodiment of a system for the collection and analysis of particulates.
Figure 9C:
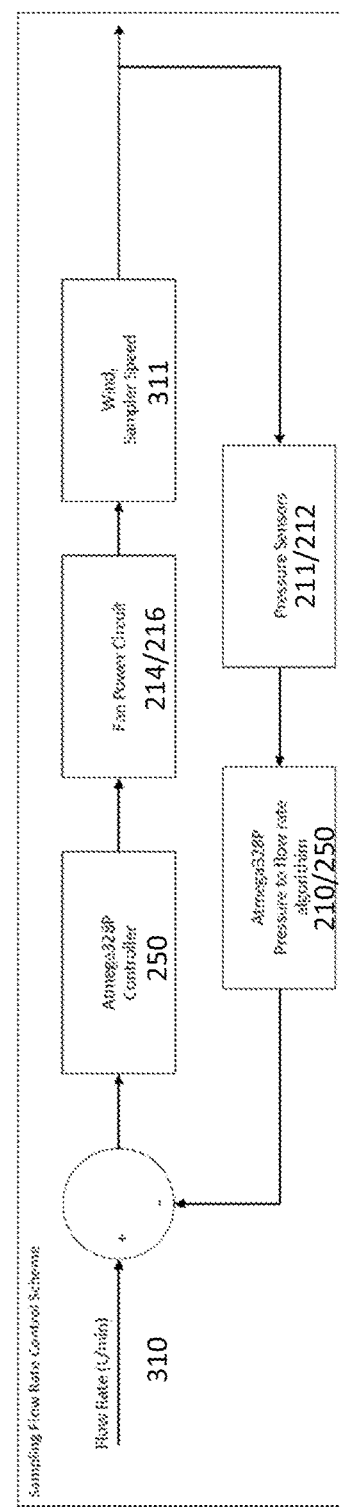
FIG. 9C is a flow diagram of an embodiment of a flow rate control scheme using the disclosed sampling device.
Figure 10:
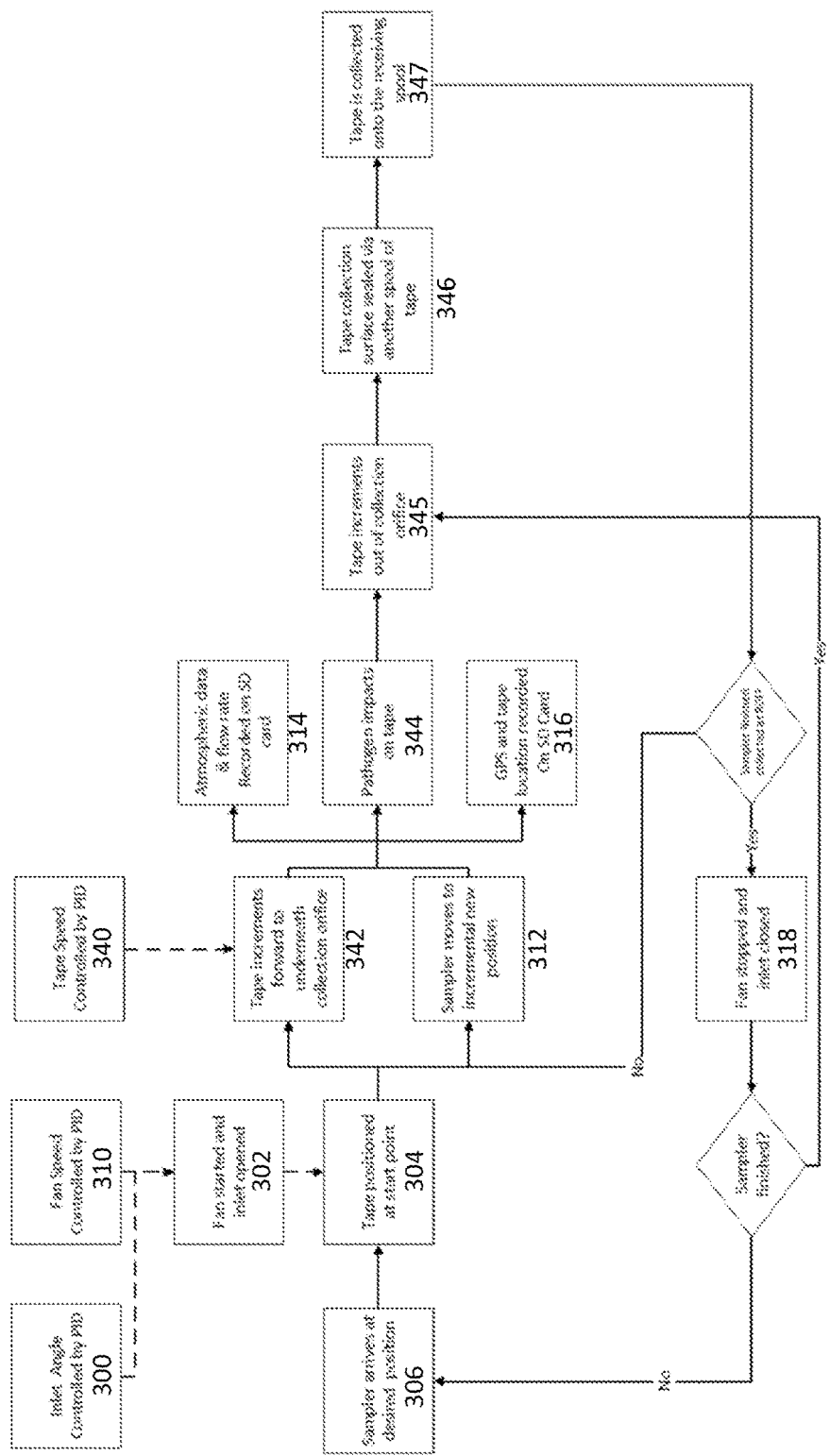
FIG. 10 is a flow diagram of an embodiment of a method of collecting particulates using the disclosed sampling device.
Figure 11:
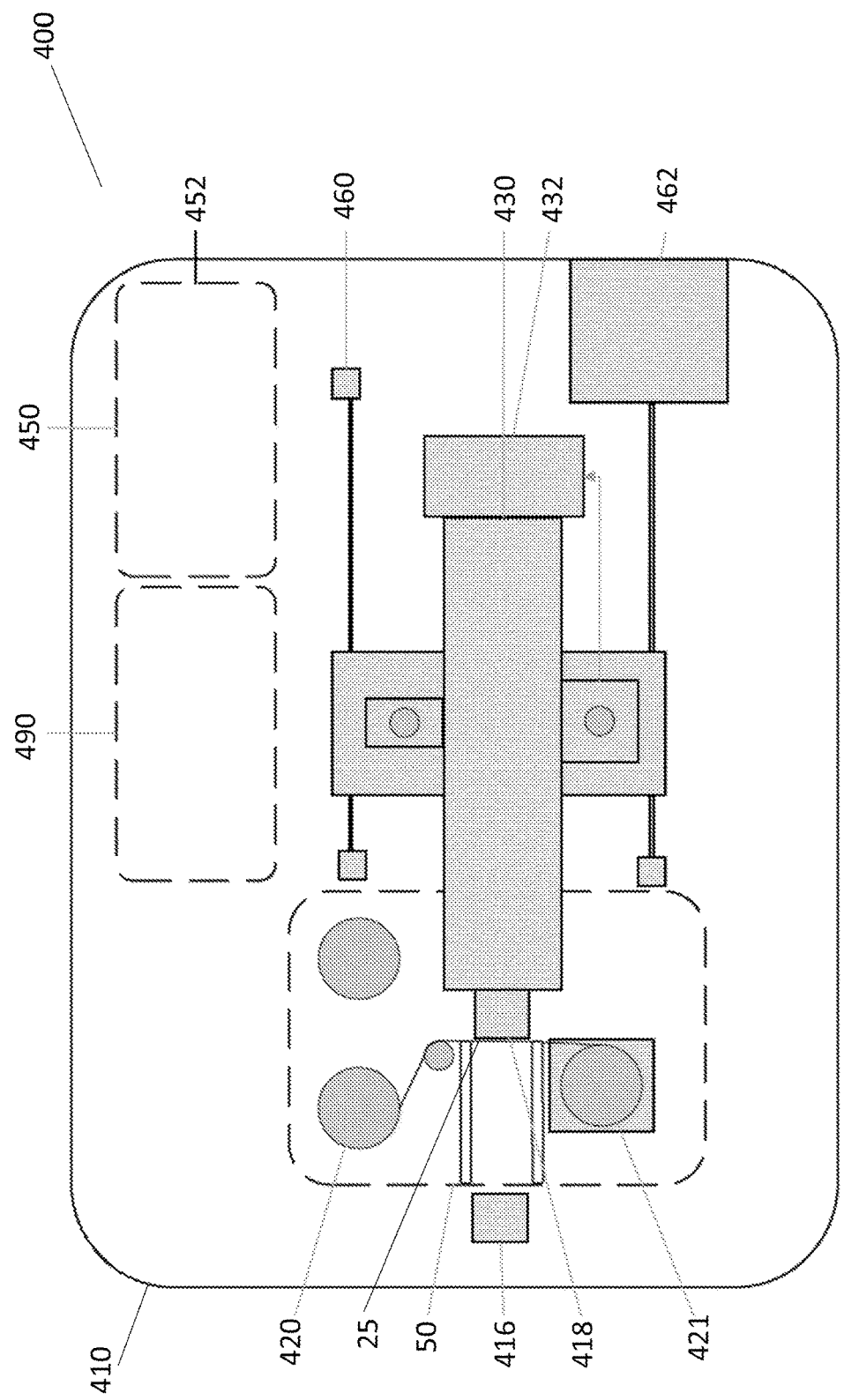
FIG. 11 is a cross-sectional view of an embodiment of an analysis system.
Figure 12:
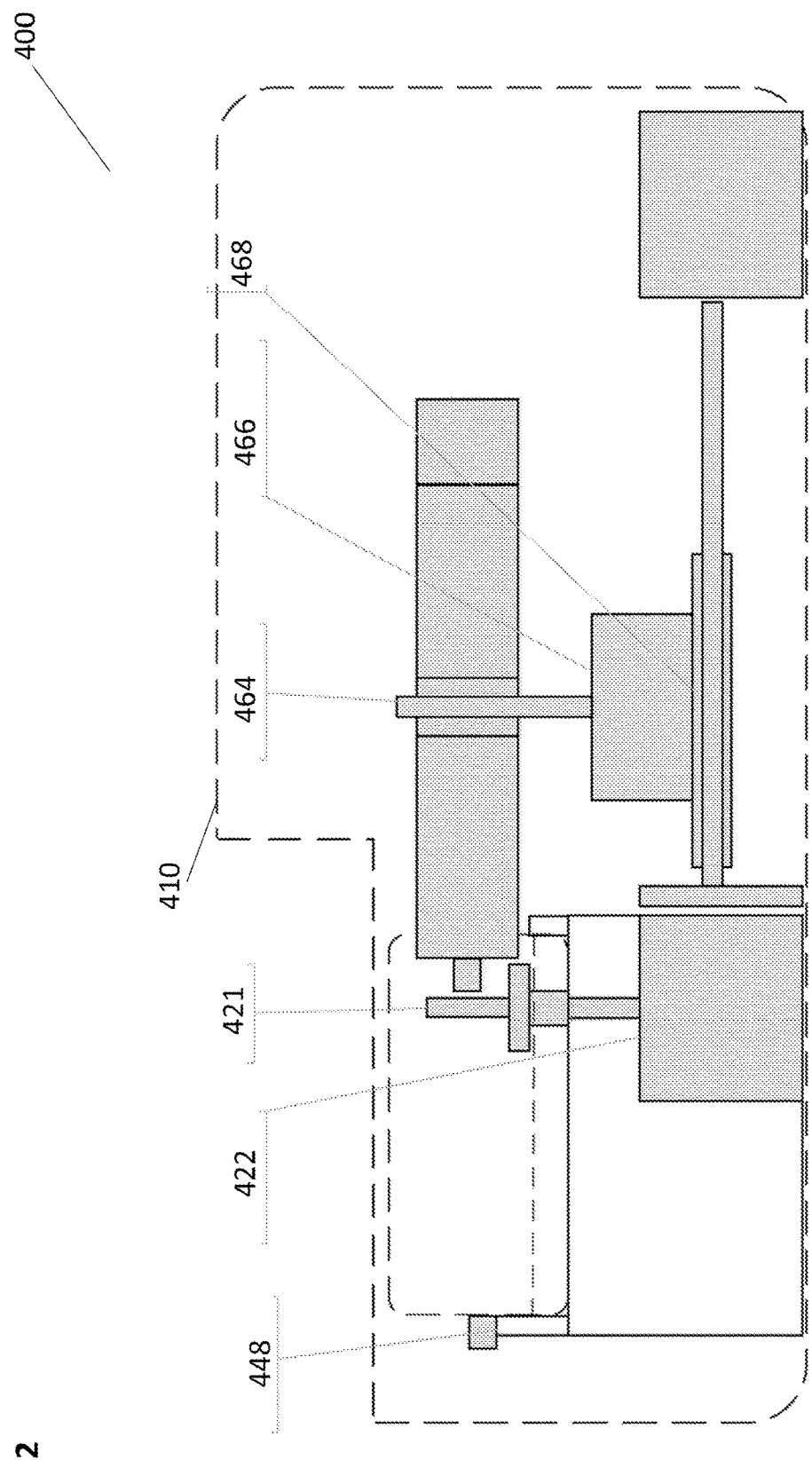
FIG. 12 is a side cross-sectional view of the analysis system of FIG. 11.
Figure 13:
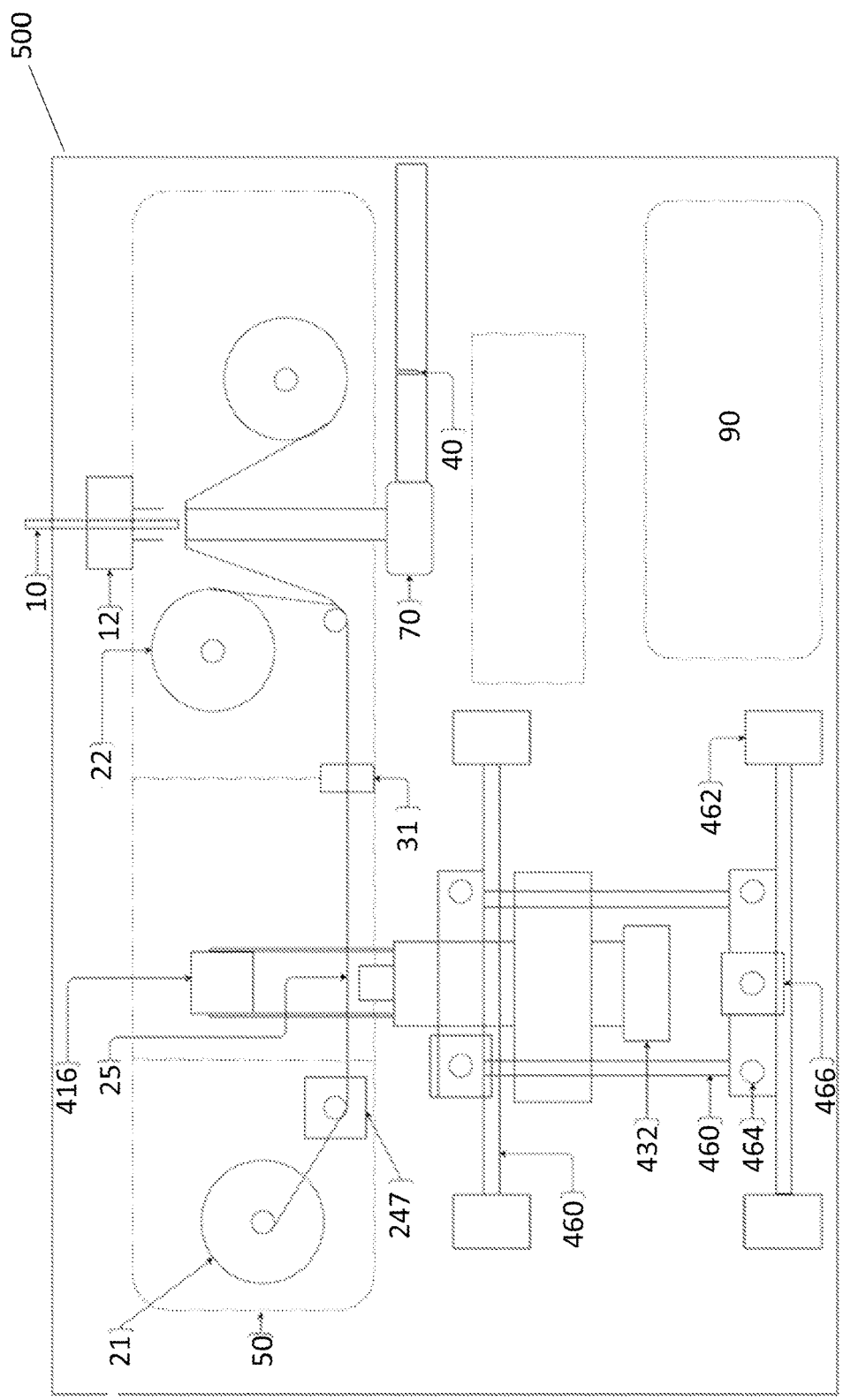
FIG. 13 is an embodiment of a real-time sampling and analysis system.
Figure 14:
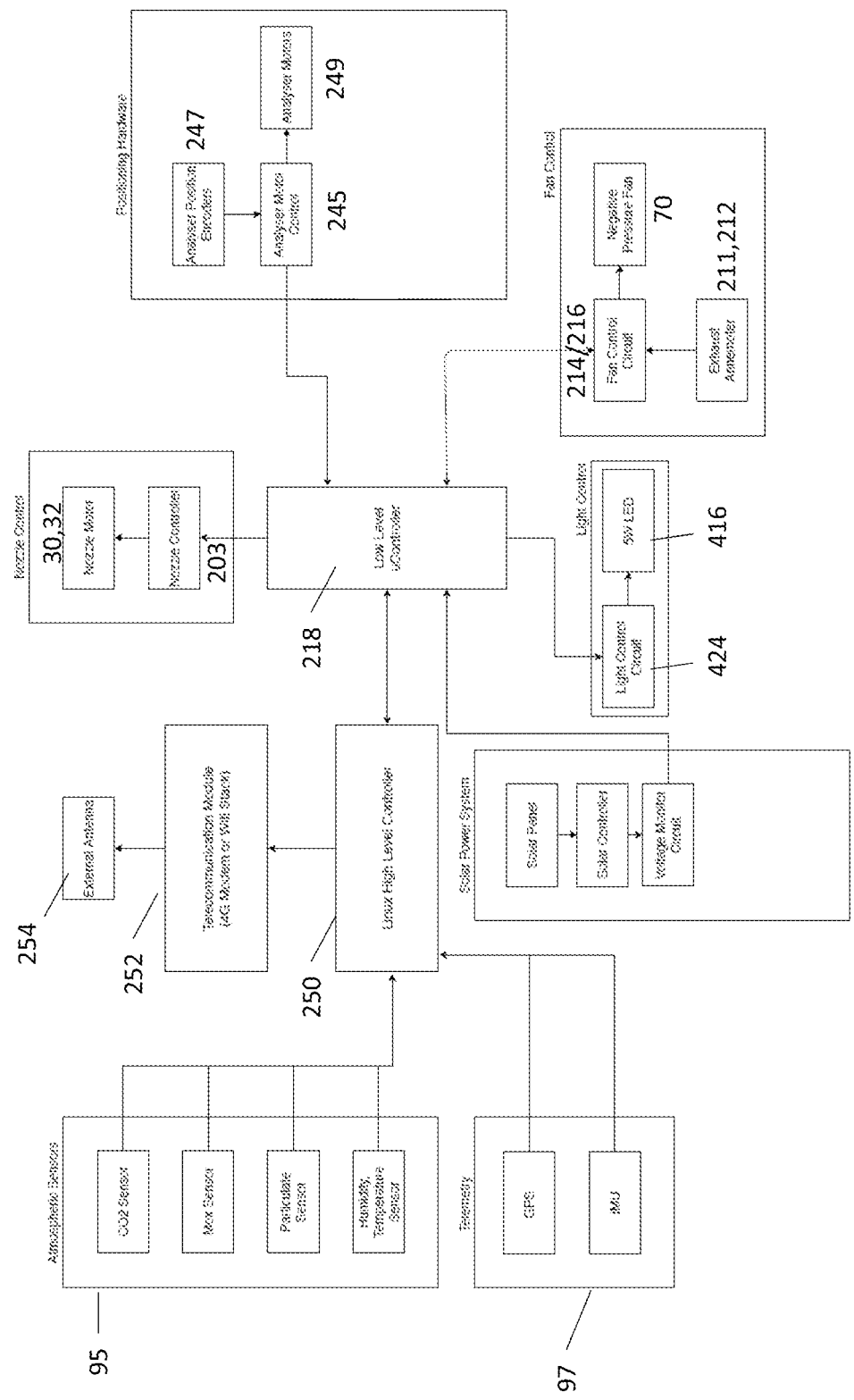
FIG. 14 is a block diagram of an embodiment of an embodiment of a real time monitor.

FIGS. 8B and 9C illustrate an embodiment of the flow rate control scheme. In the illustrated embodiment, the flow rate 310 can be predetermined and input to a controller 250 which in turn drives a fan circuit 214, 216 at the predetermined rate. The resultant flow rate of fluid exiting from the outlet 18 of the intake body 10 and passing the surface portion 26, can be affected due to changes in wind speed or changes to the absolute speed of travel of the sampling device 311. Sensors 211, 212 are therefore used to measure the pressure differential such that the controller 250 can calculate the relative velocity of the fluid exiting from the outlet 18 and passing the surface portion 26 at the collection position 25. The controller 250 can subsequently utilise the calculated relative flow rate in a feedback control, to adjust the fan circuit 214, 216 such that the relative flow rate calculated is maintained at a level which is substantially equivalent to the predetermined input flow rate 310.

Inlet and Outlet Control

The sampling device can be configured to orient the inlet such that the flow of fluid ingested therethrough is substantially laminar and iso-axial. In embodiments such as in FIGS. 1 to 10 and 13 to 14, where the device also comprises fluid flow control, the fluid flow through the inlet may also be iso-kinetic. The combination of these flow conditions may advantageously enable the aspiration and improved sampling efficiency for the desired particle size. Aspiration efficiency can be defined as the percentage of particulates in the fluid entering the inlet compared to the percentage of particulates in the atmospheric fluid. Sampling efficiency can be defined as the percentage of particles in the fluid captured onto the surface portion of the sampling device. Laminar flow may occur when there is a stable unidirectional flow of a fluid without any cross-currents. The flow may thus occur in a plurality of parallel layers which may then be represented by airstream lines. In some embodiments it may be advantageous when maximising sampling effectiveness to utilise an inlet that is clear of obstacles (see FIG. 2). When the sampling device 100 exhibits laminar fluid flow into the inlet, there may be a reduction in incidents of the particulates contacting an inner wall of the intake body. This may be advantageous when maximising aspiration effectiveness in the sampling device.

During operation of the disclosed sampling device 100, the sampled fluid can pass into the inlet 16 and through the intake body 10 into the sampling device 100. In the illustrated embodiments of FIGS. 1 to 7 and 13 the intake body takes the form of a nozzle system, however, in some embodiments the intake body can include an orifice. The nozzle includes an elongate intake body extending between a first end and a second end. The inlet 16 is positioned at a first end of the intake body on an inlet portion of the body. The outlet 18 is positioned at a second end of the intake body on an outlet portion of the intake body, the second end being proximal the surface portion 26. The inlet portion of the intake body 11 extends outwardly from the sampling device 100 and can be oriented to facilitate the fluid containing particulates being ingested into the sampling device 100.

In the illustrated embodiment the inlet has a small cross-section. By having a small inlet 16 cross-section in combination with vacuum pressure generated by the exhaust fan 70, the fluid flow can be controlled to have both a uniform particle velocity as well as being substantially laminar.

In some embodiments, such as where the sampling device is exposed to winds, the inlet 16 can be orientated to account for atmospheric conditions such that the fluid flow into the inlet 16 is substantially laminar and iso-axial. In some embodiments, such as when the sampling device 100 is attached to a UAV (see FIG. 6A to 6C), the inlet can be controlled to be oriented at any given time during collection to account for pitch and roll of the sampler as it moves such that the fluid flow into the inlet remains substantially laminar.

The nozzle system 10 can be elongate and extend along a longitudinal axis. The surface portion 26 in the collection position 25 also extends along a collection axis. In the illustrated embodiments (FIGS. 1 to 4 and 13) the outlet body 14 and the outlet 18 extend along a longitudinal axis that is substantially perpendicular to the collection axis along the surface portion 26. When the fluid flowing from the outlet 18 is perpendicular to the surface portion 26, then the fluid flow can be perpendicular to where particles impact on the surface portion. In alternative embodiments, the longitudinal axis of the nozzle system, and thus the fluid flow, can be transverse or at an angle between 0 and 90 degrees relative to the axis of the surface portion.

It is understood that the relationship between the surface portions 26 and the nozzle system (and in particular the outlet body 14 and the outlet 18) can also be varied such that the size and type of particulate that can be most efficiently impacted onto the surface portions 26 is determined (as explained above).

The sampling device 100 can also include a sensor and nozzle control system 203 such as a gyroscope 202 system. For example, the gyroscope 202 can direct the inlet orientation control module 12 to control and adjust the principal axis (i.e. pitch, yaw) of the inlet body 11 in response to measured environmental conditions. The inlet orientation control module 12 can, for example, comprise a rotary wheel 34, a plurality of servo motors 30, 32, a 9-Axis DOF Module (accelerometer, gyroscope, compass), a GPS, a sensor or plurality of sensors for measuring the pressure differential, a temperature sensor, a humidity sensor.

The sampling device 100 can also have an externally mounted particulate and dust sensor that calculates a real-time reading on the particulate matter in the air, thereby providing an indication of the ambient air quality and how the sampling accuracy may be impacted due to dirt and dust ingress into the system during collection. If a certain threshold is breached for a sustained period of time, the particulate and dust sensor can be configured to stop the sampling collection for a period of time.

The sampling device 100 can also have one or more externally mounted sensors 95 that measures the ambient $CO_2$ and aggregate Volatile Organic Molecules (MoX). These measurements can be correlated to plant stress and disease during analysis of the collected sample.

In some embodiments of the inlet orientation control module (see FIG. 7), the rotary wheel 34 is mounted on a 2D bracket gimbal 36, 38 that can be actuated by 2 servo motors 30, 32. The inlet 16 can then be attached to the rotary wheel 34 mid-section via the inlet body 11.

The inlet body 11 can be a flexible connector such as a plastic tube, however, in some embodiments the inlet body 11 can be rigid. It is understood that the length and tubular cross-section of the inlet body 11 can be varied to suit the type of sampling being performed.

In an alternative embodiment (not shown), the inlet body is mounted on a spherical container located at the opening of a funnel, which acts as a socket for the spherical container. The funnel acts as the outlet body and can channel fluid towards the surface portion. The spherical container can be actuated in 3-axis. In some embodiments, the spherical container can be actuated by three servo motors that use rollers to rotate the spherical container, thereby rotating the inlet body and inlet such that it is directed substantially colinearly with the direction of the relative fluid flow around the sampler. This may advantageously enable the fluid flowing into the inlet to be substantially laminar and isokinetic.

Orientation of the inlet 16 by the inlet orientation control module 12 may be advantageous in improving collection efficiency as a direct path can be maintained through which particulates can enter the sampling device 100. This may also advantageously reduce turbulence in the collected fluid flow.

The relative fluid flow includes the relative measurements of the speed and direction of both the sampler and ambient fluid flow (e.g. wind). For example, in a zero-cross-wind W condition or with a fast-moving sampler (FIG. 6B) the nozzle system 10 will adjust to face into the direction of travel Z of the sampler 100. In a further example, the wind speed W increases in a direction that is at an angle to the sampler 100 direction Z (FIG. 6C), the nozzle system 10 may adjust the angle of its yaw to account for this.

Referring for example to FIG. 8B, in some embodiments the pitch, yaw and roll of the sampler can be measured using a gyroscope sensor 202. In some embodiments the direction and speed of motion of the sampling device 100 can be measured by either the onboard compass, the GPS 242 or a combination thereof. In some embodiments, measurements can be passed through the controller unit 250 that can process the measurements and provide feedback to the relevant driving arrangements such as the servo motors 30, 32, stepper motors 244, 246 or exhaust fan 214 (e.g. in the flow rate control by controlling the fan, as depicted in FIG. 9B).

FIG. 9A depicts the linear control where the controller 250 accounts for the wind induced change in the pitch 301 of the sampling device 100, by feeding back a reading of the gyroscope 202, to maintain the sampling device 100 substantially at a desired or pre-set pitch angle 300.

In some embodiments, the speed and direction of the atmospheric fluid flow can be calculated by the controller 250 using a forward-facing pitot-static tube 44 (shown in FIG. 1), in combination with pressure sensors 211, 212 and temperature sensors, the compass and the GPS 242. The controller 250 can calculate the fluid density from the pitot-static tubes 40, 44 (or anemometer) in combination with the pressure 211, 212 and temperature sensors. Using these calculations, the controller 250 can thereby calculate the true speed of the atmospheric fluid flow. When combined with the reading from the compass and GPS 242, the controller 250 can calculate both the true heading and direction of the atmospheric fluid flow, as well as the ground speed and track direction. The relative speed and direction of the atmospheric fluid flow can then be calculated by the controller 250 by subtracting the true speed vector from the ground speed vector.

In some embodiments, the external pressure and relative velocity sensors (e.g. pitot tube or anemometer 44) can rotate using a servo motor system to account for lateral motion of the sampler measured by the accelerometer/gyroscope 202 circuit.

The pitch and yaw can be adjusted by rotary actuators such as a plurality of servomotors 30, 32 based on feedback from sensors inbuilt on the sampling device 100. More specifically, the pitch can be adjusted in the presently disclosed embodiment based on feedback from the gyroscope 202 and accelerometer. The yaw can be adjusted in the presently disclosed embodiment based on feedback from the controller 250 after calculating relative speed and direction of the atmospheric fluid flow.

Using the calculated relative direction of the atmospheric fluid flow W, the controller 250 can adjust the pitch of the inlet 16, by adjusting the pitch of the inlet body 11 such that the pitch of the inlet body 11 maintains an orientation θ that is parallel to the direction of travel Y of the sampling device 100 (see FIG. 6A). An example of the aforementioned pitch control is shown in FIG. 9A, and is discussed later in the specification.

Figure 7:
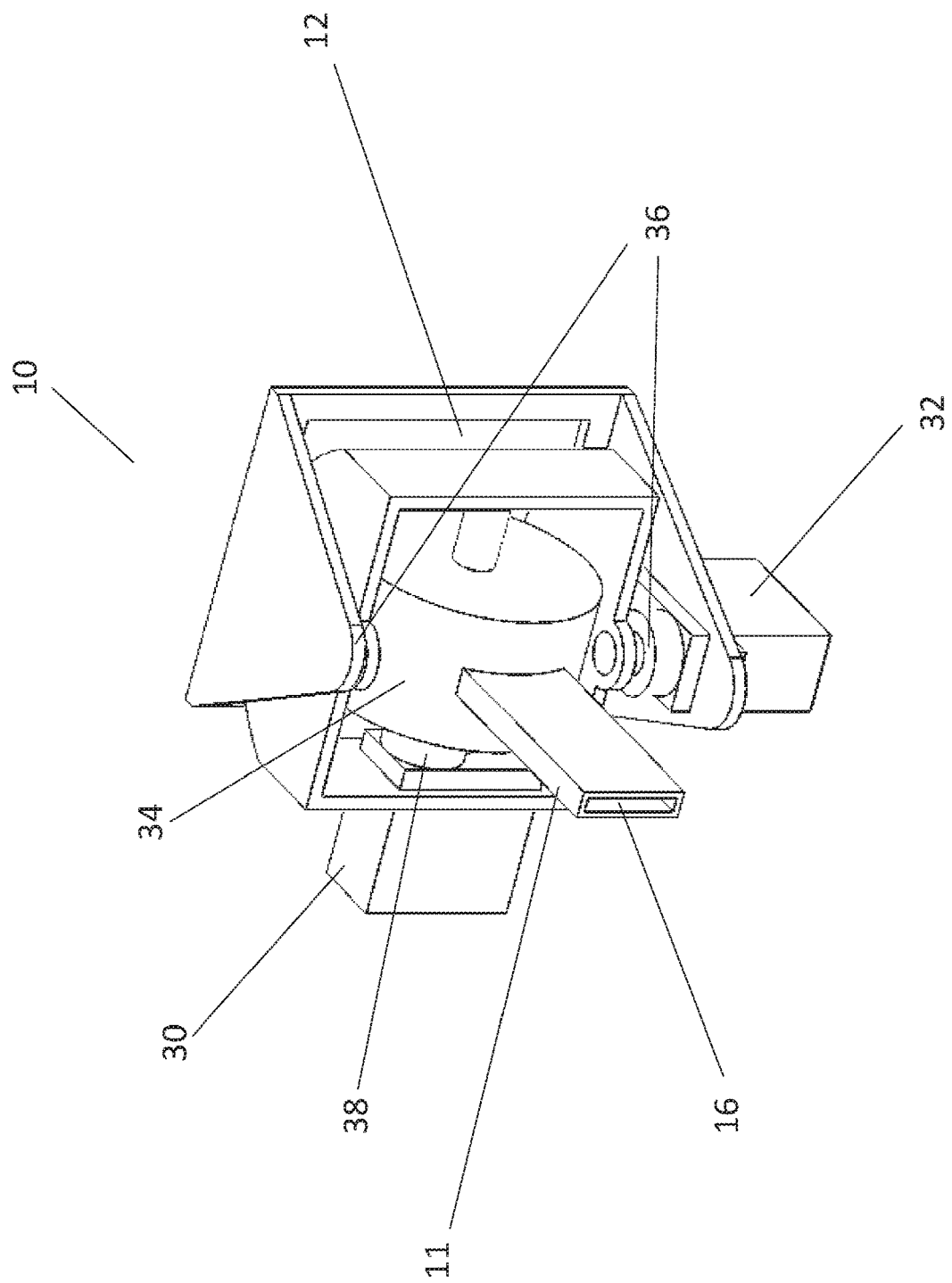
FIG. 7 is an isometric perspective view of an embodiment of an inlet and outlet control of the sampling device of FIG. 1.

In the embodiment of the inlet orientation control module 12 shown in FIGS. 6 to 8, the controller 250 controls the orientation of the rotary wheel 34 and inlet 16, by controlling the servo motor 30 which drives the rotary wheel 34 about the Y-axis passing through the horizontal gimbal bearing 38. When the pitch of the sampling device 100 changes in a direction relative to the horizontal, the gyroscope 202 and controller 250 can measure the change relative to θ and provide the change in a feedback (to the controller 210/250) to the servo motor 30, to reorient the inlet 16 to be parallel to the direction of travel Y.

The inlet orientation control also includes yaw control. Using the calculated relative direction of the atmospheric fluid flow, the controller 250 can adjust the yaw of the inlet 16, by adjusting the yaw of the inlet body 11 such that the yaw of the inlet body 11 maintains an orientation α that account for the relative direction of the atmospheric fluid flow W (see FIGS. 6B and 6C). In the illustrated embodiment, the inlet body 11 is substantially parallel to the relative direction of the atmospheric fluid flow. A linear control paradigm similar to that discussed in relation to FIG. 9A for the pitch control, can be applied for the yaw control.

For instance, in the embodiment of the inlet orientation control module 12 shown in FIGS. 7 and 8A, the controller 250 can orient the rotary wheel 34 and inlet 16 by rotating the servo motor 32 about the Z-axis passing through the vertical gimbal bearings 36. When atmospheric wind conditions W change in direction relative to the axes of the sampling device 100, the controller 250 can measure the relative change utilising the sensors (as above) and provide the feedback (via the controller 210/250) to the servo motor 30 to reorient the inlet 16 substantially parallel to the relative direction of the atmospheric fluid flow W (see FIGS. 6B and 6C).

Method of Collection of Particulates Using a Sampling Device

FIG. 10 shows an example of a method of collecting particulates using the sampler disclosed herein and associated data. The steps included in the flow diagram may be performed in the order indicated by the arrows. While the flow diagram refers to tape, it is understood that alternative forms of the surface portion are available. Also, the flow diagram refers to pathogens, and as discussed above, it is understood that the sampler may collect many forms of particulates including pathogens.

Further, although now shown in the flow diagram, atmospheric and geospatial data may be collected that is correlated with specific particulates. Some examples of atmospheric data are wind, temperature and humidity. Some examples of geospatial information are time and location. This data may be stored on a removable memory device. This data may be stored in relation to a static device or a mobile device. In relation to a mobile device, storing this data is advantageous as it accurately records information about the collected particulates that assists in developing the infestation maps and threat prediction software of diseased air borne particulates discussed in more detail below.

Analysis System

The surface portions 26 containing the particulates may be removed from the sampling device for post processing and analysis. In some embodiments, as shown in FIGS. 2 and 3, the surface portions are continuous on a common surface such as tape which is contained within a removable cassette-like system 50 which may protect the surface portion 26 when it is not inside the sampling device 100 or a device for post processing.

In the embodiment shown in FIGS. 11-12, a collection arrangement analysis system 400 receives the cassette 50 for post processing and analysis of the surface portions 26. The cassette 50 can be secured in collection arrangement analysis system 400 by a holding mechanism 448. In some embodiments of the collection arrangement analysis system 400, the system can scan through contiguous surface portions 26 (such as a tape) that is continuous and can contain continuous data. In some embodiments, the collection arrangement analysis system 400 scans the surface portions that are static, such as microscope slides. In some embodiments, the collection arrangement analysis system can receive both dynamic and static surface portions for analysis.

The collection arrangement analysis system 400 can scan through the surface portions (whether it is a moveable tape or a static slide) by shining a backlight 416 (e.g. LED) through the respective surface portion 26 as it passes a microscope optic 418. A light control circuit 424 and the light 416 (see FIG. 14) form a light module, which can be subject to system control from the controller(s) 250, 218. The microscope optic tube 430 (on which the microscope optic 418 is mounted) also comprises a microscope camera 432 which may either read in real time or capture images of the surface portions as they move from the supply reel 420 to the collection reel 421. The collection reel 421 is driven by a motor 422 which can be operated a manner similar to the collection reel 21 of the sampling device (see above). Similarly, where a moveable collection arrangement is used, the speed of movement of the surface portions 26 may be controlled to be constant.

The microscope optic tube 430 can be moved within the collection arrangement analysis system 400 housing 410 in both vertical and horizontal directions. This may optimise the optical scanning. The microscope optic tube 430 can rest on a horizontal optic platform 468 and then moved along a vertical optic guide shaft 464 by a vertical optic motor 466 or along a horizontal movement guide 460 by a horizontal positioning motor 462.

In some embodiments, collected images of the surface portions 26 can be analysed using spectroscopy to determine the spectral signature of a material. The collection arrangement analysis system 400 may identify the spectral signature of a collected particulate to identify the composition of the material. The spectral scanning is done by adding a Near Infrared/Visual Spectrum sensor which can be achieved through optical beam splitting (binocular microscope).

In some embodiments, collected images of the surface portions 26 can be analysed by optical detection and analysis methods. Optical detection and analysis methods include use of computer vision and convolutional neural networks (such as optical image recognition) to detect the presence of different particulates on the surface portions 26.

In some embodiments collected images of the surface portions 26 can be analysed by a combination of spectral and optical analysis methods.

A controller 450 controls the collection arrangement analysis system 400 during operation and can send the optical images and spectral scans to a computer or processor 452 that is connected either by wifi, bluetooth, cable or any other connection means for further processing. In some embodiments, the controller 450 may act as a processor and process collected data independently.

The optical images and spectral scans produced by the collection arrangement analysis system 400 can then be processed by the connected computer 454, where intelligent deep learning algorithms to classify and enumerate the collected particulates on the surface portions 26. The algorithms will have been trained using a training data set to detect or identify the various classes or types of particulates. The optical images produced by the analysis system can further be added to the training data set, so that the detection capability may be refined by the deep learning algorithm.

In general, the collection arrangement analysis system 400 can utilise computer vision techniques such as neural networks or other object recognition methods as well as combinations of different methods to identify the collected particulates on the surface 26 portions (e.g., potential disease pathogens).

The surface portion 26 position can further be correlated with collected atmospheric data or geospatial data from the sampling device 100 (stored on a separate removable memory device such as an SD card). This may advantageously allow for 3D geospatial positioning of particulate types and concentrations whilst also providing the relevant local atmospheric data which can then be used for further independent analysis or modelling. This can enable the generation of a database of particulate data, which can be converted by a computer into a high-precision map of the survey region. The output survey map will thus convey the local data (e.g. of particulate types, concentrations, of the local atmospheric data) in accordance with the geographical location where the data is collected.

As mentioned above, the utilisation of a machine learning based approach may act to improve the results obtained over time, thereby improving the accuracy of detection and identification for the particulates, such as pathogens and diseases, by the trained algorithm. The scan data from the optical or spectral sensor can be provided as training data to a machine learning algorithm, enabling the algorithm to refine the detection results as more training data become available.

Real Time Analysis System

In some embodiments, the sampling device 100 and collection arrangement analysis system 400 can be incorporated into a singular sampling and analysis system 500. The collected particulates, once captured on the surface portions 26 (in essentially the manner described above) can be air-sealed 31 between the surface portions 26 and the cover (e.g., tape) from the covering reel 22. The surface portion 26 to be analysed can then be passed by the backlight 416 where the sample can be read by the microscope optic 418 and/or microscope camera 432. The analysis process is essentially the same as the analysis process described above. Once the sample has been processed, the tape position can be tracked by a tape position encoder 247 before the processed portion of the surface portion 26 can be wound on a collection reel.

During sampling, the sampling and analysis system 500 can be mobile or static, and can comprise any of the above described systems of control of the surface portions, control of fluid intake, and control of inlet and outlet orientation.

As described above, the sampling and analysis system 500 can also gather atmospheric data, power system feedback (solar power, battery level etc.) as well as any operational debugging information in the background whilst sampling is taking place. A high level controller 250 (see FIG. 14) controls the primary decision making of the sampling and analysis system 500, including processes such as data handling and telemetry 97 (e.g. global position system or "GPS" data, or inertial measurement unit or "IMU" data). The telemetry information can be provided with the data (e.g. overlaid with the data) captured by the system 500. As shown in FIG. 8A, where the device is a mobile device such as an aerial vehicle, the telemetry data such as GPS or IMU data can be input to a flight controller 220 for the aerial vehicle. The flight controller 220 is embodied in the same processing unit as the system controller 250, or alternatively it is separately embodied. In an example, the system controller 250 utilises the telemetry module 97 to acquire a location reference and/or a transmission path, and transmits the acquired particulate or optical/spectral scan data to a remote memory or processing location (e.g., via a telecommunication module 252).

Once the analysis has been completed by the sampling and analysis system 500, the data collected can be stored internally, copied onto a removable memory source, or sent to a server (off-site) further analysis, storage and visualization. In some embodiments, in order to communicate with an off-site server, the system 500 can have the telecommunications system 252 comprising a modem (e.g. 4G/4GX, long range wifi, CAT M1 or LoRA) with an external antenna 254. In some embodiments, the sampling and analysis system 500 can also receive information from an external source (e.g. firmware updates, sampling routes) via the telecommunications system 252.

Variations and modifications may be made to the parts previously described without departing from the spirit or ambit of the disclosure. In general, the features that contribute to the effectiveness of the fluid sampling device are that the direction and speed of the fluid flow.

The disclosed system describes various aspects of an embodiment of the sampling that control the collection parameters such that accurate particulate sampling measurements can be recorded. Collection parameters may include intake fluid velocity, speed of motion of the surface portions and fluid flow conditions. The disclosed embodiment uses a number of variations of a digital based PID (proportional, integral, derivative) controller to control such parameters.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A sampling device for the collection of particulates from a fluid, the device comprising:
   an inlet through which the fluid flows into the device; and
   a moveable collection arrangement configured to move continuously relative to the inlet and positioned such that a surface portion of the collection arrangement is in a collection position for collecting the particulates from the fluid flowing through the inlet,
   wherein the surface portion of the collection arrangement that is in the collection position varies in response to movement of the collection arrangement whilst continuously collecting particulates from the fluid flow, the movement of the collection arrangement having a velocity that is configured such that a constant volume of the fluid passes each of the varied surface portions.

2. The sampling device according to claim 1, wherein the movement of the collection arrangement is at a constant velocity.

3. The sampling device according to claim 1, further comprising a drive arrangement for moving the surface portions of the collection arrangement to and from the collection position.

4. The sampling device according to claim 3, wherein the surface portions are contiguous on a common surface and the drive arrangement comprises a supply reel and a collection reel and the common surface is wound about the reels and moveable from the supply reel to the collection reel.

5. The sampling device according to claim 4, wherein the drive arrangement rotates the collection reel such that the surface portions move from the supply reel through the collection position to the collection reel.

6. The sampling device according to claim 2, the device further comprising a sensor to determine the speed of the surface portions.

7. The sampling device according to claim 6, wherein the drive arrangement is operable, in response to the speed of the surface portions determined by the sensor, to adjust the movement of the collection arrangement such that the surface portions move through the collection position at a constant velocity.

8. The sampling device according to claim 1, wherein the surface portions when in the collection position, are substantially perpendicular to the flow from the outlet.

9. The sampling device according to claim 5, further comprising a cover arranged to overlay the surfaces portions such that the particulates collected on the surface portions are retained between the cover and the surface portions.

10. The sampling device according to claim 9, wherein the cover engages the surface portions between the collection position and the collection reel.

11. The sampling device according to claim 9, wherein the cover is in the form of a strip and is wound about a covering reel.

12. The sampling device according to claim 1, wherein the surface portions further comprises a biologically supportive substrate.

13. The sampling device according to claim 12, further comprising a reservoir for storing the biologically supportive substrate, and a dispenser for dispensing the biologically supportive substrate from the reservoir onto the surface portions, the dispenser being positioned such that biologically supportive substrate is dispensed onto the surface portions prior to moving into the collection position.

14. The sampling device according to claim 1, wherein the device is either a static device or a mobile device that is operative to collect particulates whilst the device is in motion.

15. A method for particulate detection comprising:
   positioning a collection surface with respect to at least one of an optical and spectral sensor, the collection surface in the form of a moveable collection arrangement that is configured to move continuously such that a surface portion of the collection arrangement is in a collection position for collecting the particulates from a fluid, the surface portion of the collection arrangement that is in the collection position varying in response to movement of the collection arrangement whilst continuously collecting particulates from the fluid flow, the movement of the collection arrangement having a velocity that is configured such that a constant volume of the fluid passes each of the varied surface portions;
   sensing particulates received on the collection surface using the at least one optical or spectral sensor; and
   analysing collected data from the at least one sensor using a processor.

16. The method according to claim 15, wherein the moveable collection surface is moved by a drive arrangement that moves the surface portion of the collection arrangement to and from the collection position.

17. The method according to claim 15, wherein, in the collection position, the surface portion is substantially perpendicular to the at least one optical and spectral sensors.

18. The method according to claim 15, wherein the processor correlates GPS data with the collected data from a position of the surface portion.

19. The method according to claim 15, wherein the processor utilises at least one of convolutional neural networks and computer deep learning methods to train a detection algorithm to identify the sensed particulates of the collected data.

20. The method according to claim 19, wherein the detection algorithm includes a computer vision algorithm comprising an object recognition algorithm, a neural network algorithm, or a combination thereof.

* * * * *